(12) United States Patent
Ma et al.

(10) Patent No.: US 9,785,719 B2
(45) Date of Patent: Oct. 10, 2017

(54) GENERATING SYNTHETIC DATA

(71) Applicant: Adobe Systems Incorporated, San Jose, CA (US)

(72) Inventors: Wenhui Ma, Beijing (CN); Jun Wan, Beijing (CN); Hui Li, Beijing (CN)

(73) Assignee: Adobe Systems Incorporated, San Jose, CA (US)

( * ) Notice: Subject to any disclaimer, the term of this patent is extended or adjusted under 35 U.S.C. 154(b) by 383 days.

(21) Appl. No.: 14/332,147

(22) Filed: Jul. 15, 2014

(65) Prior Publication Data

US 2016/0019271 A1    Jan. 21, 2016

(51) Int. Cl.
*G06F 17/30* (2006.01)
*G06Q 30/00* (2012.01)

(52) U.S. Cl.
CPC ....... *G06F 17/30876* (2013.01); *G06Q 30/00* (2013.01)

(58) Field of Classification Search
CPC ............... G06F 17/16; G06F 17/30876; G06F 17/30569; G06Q 30/00
See application file for complete search history.

(56) References Cited

U.S. PATENT DOCUMENTS

2006/0224531 A1* 10/2006 Abrahao ............. G06F 11/3447
706/15
2009/0018798 A1* 1/2009 Dorneich ................. G06F 17/18
702/179
2009/0126939 A1* 5/2009 Lu ............................ G01V 3/12
166/369
2009/0282042 A1* 11/2009 Russell ...................... G06F 8/71
2009/0299945 A1* 12/2009 Hangartner .............. G06N 5/02
706/50
2010/0179955 A1* 7/2010 Wu .................... G06F 17/30539
707/748
2012/0095973 A1* 4/2012 Kehoe ....................... G06F 8/70
707/694
2012/0330880 A1   12/2012 Arasu et al.
2013/0046723 A1* 2/2013 Sweeney .................. G06N 5/02
706/47
2014/0325251 A1* 10/2014 Marwah .................... G06F 1/14
713/500
2016/0041848 A1* 2/2016 Li .......................... G06F 11/008
718/104

OTHER PUBLICATIONS

Barse, E.L., Kvarnstroem, H., Jonsson, E.: Synthesizing Test Data for Fraud Detection Systems. Proceedings of the 19th Annual Computer Security Applications Conference (ACSAC 2003).

* cited by examiner

*Primary Examiner* — Shiow-Jy Fan
(74) *Attorney, Agent, or Firm* — Keller Jolley Preece

(57) ABSTRACT

Methods for generating synthetic data based on time dependent data with increased accuracy include decomposing a base dataset into a base dynamic component and at least one static component. Decomposing the base dataset includes applying a decomposition model to the base dataset. One or more embodiments generate a synthetic dynamic component based on the base dynamic component. One or more embodiments merge the synthetic dynamic component with the at least one static component to generate a synthetic dataset having at least some of the time dependent characteristics of the base dataset.

20 Claims, 14 Drawing Sheets

GENERATING SYNTHETIC DATA

CROSS REFERENCE TO RELATED APPLICATIONS

N/A.

BACKGROUND

1. Technical Field

One or more embodiments relate generally to systems and methods for synthetic data generation. More specifically, one or more embodiments relate to systems and methods of generating synthetic data with trend and/or seasonal information.

2. Background and Relevant Art

Some conventional tracking software monitors user interactions with media (e.g., hits to a website, application downloads, software error reporting). Analytics reports often detail the user interactions by showing the history of user interactions, including trends and notable events. In web applications, website developers and marketing personnel can use the analytics to predict future user traffic based on the number of hits or views a particular webpage has received. Predicting future traffic can play an important role in making development and marketing decisions for web applications and backend support.

In order to predict website traffic and other user interactions, a large amount of data may be required to produce sufficiently accurate predictions. Some methods of obtaining the data required to produce an accurate prediction include collecting previously sampled data. For example, a system can pull a large amount of actual analytics data sampled for a particular application and use the actual data to generate a prediction. Pulling a large amount of analytics data to produce an accurate predictive analysis, however, can use a large amount of processing power and/or processing time, resulting in an impractical solution.

Additionally, the available set of analytics data may not be available or may not contain enough data points to produce an accurate predictive analysis. Additionally, the pool of available data may include sensitive or confidential information. Using a limited pool of data for generating a prediction can result in inaccurate or otherwise unsatisfactory predictions.

In order to generate or expand the pool of data for use in predictive analysis, many methods use a set of actual analytics data to generate synthetic data. For example, some methods use random resampling of collected data to increase the amount of data available for generating predictions. While random resampling in a conventional resampling process can provide good predictive results based on data that has no time dependent characteristics, autoregressive models that generate the synthetic data or aid in the predictions do not retain trend information, seasonal characteristics, or other time dependent relationships between data points. Additionally, autoregressive models typically only apply to stationary processes or non-stationary processes with stationary successive differentiation. Thus, using autoregressive algorithms to predict time-dependent events can lead to unsatisfactory results.

These and other disadvantages may exist with respect to conventional data prediction techniques.

SUMMARY

One or more embodiments provide benefits and/or solve one or more of the foregoing or other problems in the art with systems and methods for synthetic data generation. For example, one or more embodiments involve generating synthetic data using a base dataset. In particular, one or more implementations include decomposing a base dataset into a base dynamic component and at least one static component. The system and methods can then generate a synthetic dynamic component based on the base dynamic component. One or more embodiments merge the synthetic dynamic component with the at least one static component to generate a synthetic dataset having at least some of the time dependent characteristics of the base dataset.

Specifically, one or more embodiments generate the synthetic data using trend and seasonal components from the base dataset and a new dynamic component based on a dynamic component of the base dataset. Generating the synthetic data from the base dataset can involve merging a synthetic dynamic component with one or more static components from the base dataset. Thus, one or more embodiments can generate a pool of data including synthetic data based on real (measured) data while maintaining time dependent information from the real data in the synthetic data.

Generating the synthetic data can include applying a decompose-merge model to a base dataset that includes real data. The decompose-merge model can determine a plurality of components from the base dataset. Specifically, one or more embodiments of the decompose-merge model can decompose the base dataset into a dynamic component and at least one static component. One or more embodiments generate a new dynamic component after decomposing the base dataset and merge the new dynamic component with the at least one static component to produce a synthetic dataset.

The methods and systems disclosed herein can provide improvements in synthetic data generation by retaining time dependent characteristics corresponding to time series or other time dependent data. In particular, decomposing the time dependent data into static components (e.g., trend information, seasonal information) and dynamic (random) components allows the system to replace dynamic data in the base dataset with synthetic data while maintaining the static components associated with the measured data. In one or more embodiments, the decomposition-merge model can generate synthetic data with a new dynamic component for either stationary or non-stationary data.

Additional features and advantages of one or more embodiments of the present invention will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features of the invention may be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
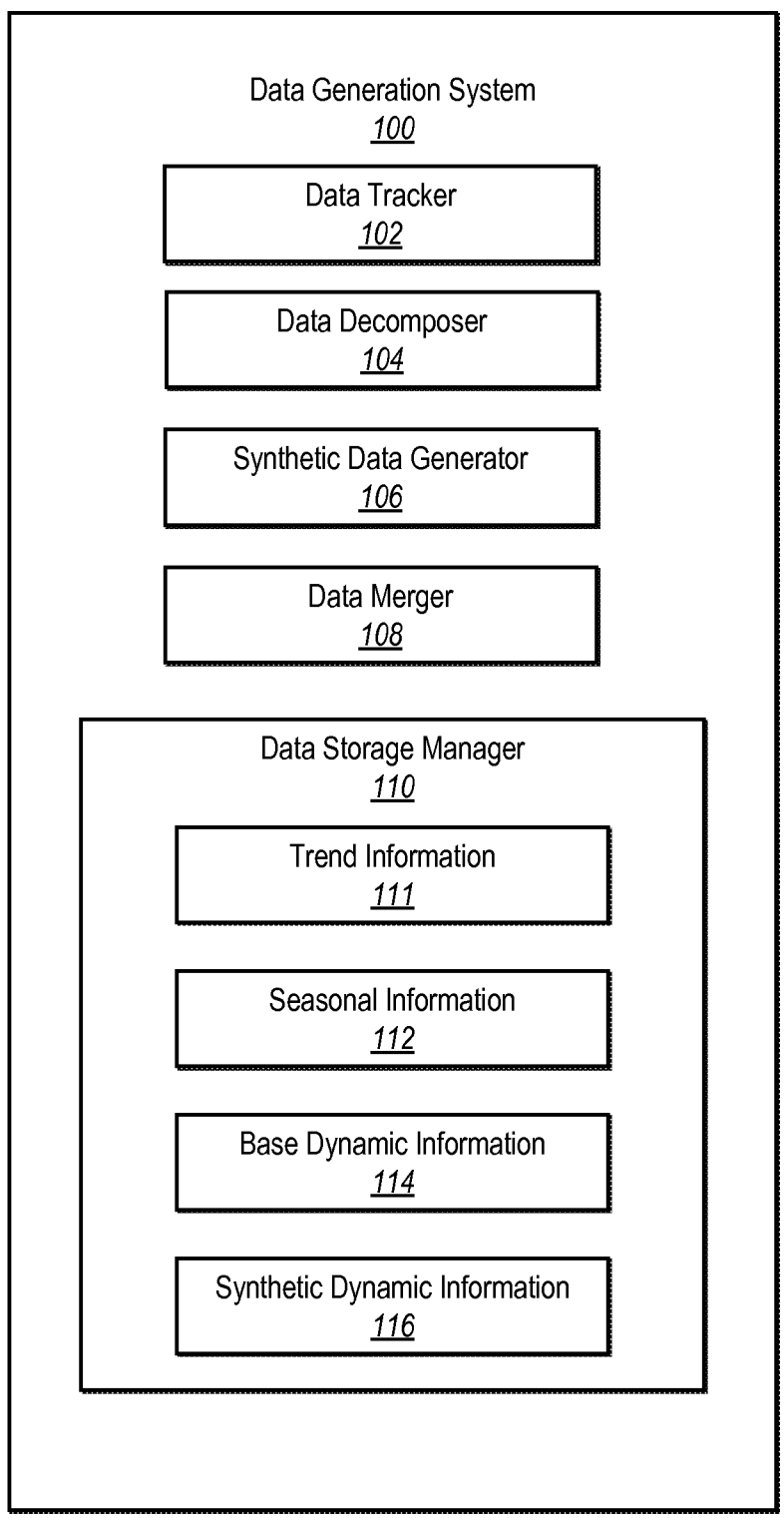
FIG. 1 illustrates a schematic diagram of a data generation system in accordance with one or more embodiments.

One or more embodiments include a data generation system. The data generation system produces synthetic data from a base dataset having certain time dependent characteristics. In particular, the data generation system can generate synthetic data from the base dataset by first decomposing the base dataset into a dynamic component, a trend component, and/or a seasonal component. The data generation system can generate a new dynamic component based on the dynamic component of the base dataset. The data generation system can then merge the new dynamic component with the trend component and/or the seasonal component to generate a synthetic dataset.

In one or more embodiments, the data generation system applies a decompose-merge algorithm to the base dataset to obtain the synthetic dataset. Specifically, the decompose-merge algorithm first decomposes the base dataset into a plurality of components. For example, the decompose-merge algorithm decomposes the base dataset into at least one static component and a dynamic component. The at least one static component can include trend information—and seasonal information if the base dataset is a seasonal dataset—that describes certain time-dependent characteristics of the data in the base dataset. The dynamic component can include a random component that may not describe or correspond to time dependent characteristics of the base dataset.

After decomposing the base dataset into a plurality of components, the data generation system generates a new (synthetic) dynamic component for replacing the dynamic component from the base dataset. The data generation system can generate the new dynamic component based on the dynamic component from the base dataset. In one or more embodiments, generating a new dynamic component allows the data generation system to remove sensitive or confidential characteristics of the base dataset and replace it with synthetic data having similar characteristics as the dynamic component from the base dataset.

In one or more embodiments, the data generation system generates the new dynamic component according to a normal distribution for the base dataset. Specifically, the data generation system can generate the new dynamic component from the base dataset according to a specified distribution of resampled data from the base dataset. For example, the specified distribution can include a three-sigma rule corresponding to the normal distribution of the base dataset. To illustrate, the data generation system can randomly resample data points from the base dynamic component according to the three-sigma rule. The data generation system can alternatively use other types of distributions or methods for generating the new dynamic component from the dynamic component of the base dataset.

The data generation system uses the new dynamic component to generate a synthetic dataset. For instance, the data generation system can generate the synthetic dataset based on the new dynamic component and the static component(s) from the base dataset. To illustrate, after generating the new dynamic component, the data generation system can merge the new dynamic component with the trend information—and seasonal information if the base dataset is a seasonal dataset—to obtain a synthetic dataset. Generating the synthetic dataset using components from the base dataset maintains at least some of the time dependent characteristics of the base dataset in the synthetic dataset.

In one or more embodiments, the data generation system can implement anomaly testing for the synthetic dataset. Specifically, the data generation system can allow a user to verify how the synthetic dataset responds to anomalies introduced using the decompose-merge model. For example, the data generation system can provide an interface for inputting anomalies into the new dynamic component. The data generation system can merge the new dynamic component including one or more anomalies with the static components from the base dataset to generate a synthetic dataset including the anomalous data. The interface can present the synthetic dataset to the user in the interface for viewing the effects of the anomalous data on the synthetic dataset.

In one or more embodiments, the data generation system can generate synthetic data for use in predicting future data based on collected analytics data of previous user interactions (e.g., visits to a website, application downloads, ad clicks, purchases). One can appreciate that while the data generation system can generate synthetic data for use in predicting user interactions with a website, the data generation system can generate synthetic data for events associated with any type of system. For example, the synthetic data can allow for analysis within and across different communication channels (e.g., a website or a call center) to provide a clear picture of a company's customers and to measure how the customers interact with each other or with the company using the communication channels. In another example, the data generation system can generate synthetic data for use in expanding a test dataset, testing conditions that may not occur in a production environment, and/or producing data according to particular criteria that are applied to one or more of the components merged to generate the synthetic data.

As used herein, the term "base dataset" refers to a dataset used to generate additional data. In particular, the base dataset can include sampled data corresponding to actual or real data collected for an event related to a particular system. For example, the base dataset can include data representing hits to a website, clicks on an advertisement in a webpage or application, user interactions with a particular element in an application, or any other event corresponding to a software component or other system.

As used herein, the term "synthetic dataset" refers to a dataset generated from a base dataset. In particular, the synthetic dataset can include data that is resampled or generated based on data contained in the base dataset. For example, the synthetic dataset can include at least one or more components of data generated by randomly resampling at least one component from the base dataset. One or more embodiments use a synthetic dataset to expand the base dataset for predicting future data for a particular system with greater accuracy.

As used herein, the terms "decompose-merge model" refers to a process for determining or extracting components from the base dataset and recombining or mixing one or more of the extracted components with one or more new components. In particular, the decompose-merge model can extract components from the base dataset and merge one or more of the components with a new random component to generate a synthetic dataset. For example, the model can extract components representing certain time dependent characteristics of the base dataset and combine those components with one or more synthetic components.

As used herein, the term "time dependent characteristic" refers to a characteristic of the base dataset and/or of the sampled data points in the base dataset that describes a time relationship of data in the base dataset. In particular, the "time dependent characteristic" can describe at least one characteristic of time series data. For example, a "time dependent characteristic" can include, but is not limited to, a chronological order of the sampled data points, trend information for the sampled data points, time relationships of groups of sampled data points, and other characteristics determined by or describing a time relationship of the sampled data points. To illustrate, a "time dependent characteristic" can include trend information and/or seasonal information obtained from a base dataset.

As used herein, the term "event" refers to any data that can be quantified. Specifically, an "event" can include data that is capable of being sampled, resampled, and used in a prediction process for determining future data points. For instance, an "event" can include a user interaction with an application, an user visiting a website, an advertisement click, a software application download, a purchase, a data point representing financial information for a given point in time, and/or other user interactions or quantifiable data.

The methods and systems disclosed herein can provide improvements in generating synthetic data by generating new data from a base dataset while maintaining time dependent characteristics of the base dataset. In particular, maintaining the time dependent characteristics from the base dataset when generating new data provides new or additional data informed based on the base dataset. For example, newly generated synthetic data can expand a dataset for predicting future data based on the base dataset. In one or more embodiments, particularly with regard to time series data, informed synthetic data can provide an improved dataset for predicting future data.

FIG. 1 illustrates a schematic diagram of one embodiment of a data generation system 100. The data generation system 100 may include, but is not limited to, a data tracker 102, a data decomposer 104, a synthetic data generator 106, a data merger 108, and a data storage manager 110. Each of the components of the data generation system 100 can be in communication with one another using any suitable communication technologies. It will be recognized that although the components of the data generation system 100 are shown to be separate in FIG. 1, any of the components may be combined into fewer components, such as into a single component, or divided into more components as may sere a particular implementation.

The components can comprise software, hardware, or both. For example, the components can comprise one or more instructions stored on a computer-readable storage medium and executable by processors of one or more computing devices (e.g., client devices and/or server devices). When executed by the one or more processors, the computer-executable instructions of the data generation system 100 can cause the computing device(s) to perform the document generation methods described herein. Alternatively, the components can comprise hardware, such as a special purpose processing device to perform a certain function or group of functions. Additionally or alternatively, the components can comprise a combination of computer-executable instructions and hardware.

Furthermore, the components of the document generation system may, for example, be implemented as a stand-alone application, as a module of an application, as a plug-in for applications including image processing applications, as a library function or functions that may be called by other applications such as data prediction applications, and/or as a cloud-computing model. Thus, the components of the data generation system 100 may be implemented as a stand-alone application, such as a desktop or mobile application. Alternatively or additionally, the components of the data generation system 100 may be implemented in any application that allows users to generate synthetic data for any type of collected data, including but not limited to data collected for a third-party application. For example, the data generation system 100 can be implemented in ADOBE SITECATALYST. "ADOBE" AND "SITECATALYST" are registered trademarks of Adobe Systems Incorporated in the United States and/or other countries.

As mentioned above, the data generation system 100 can include a data tracker 102. In one or more embodiments, the data tracker 102 facilitates tracking data for a system, such as a software component. For example, the data tracker 102 can track user interactions with an application. To illustrate, the data tracker 102 can track the number of visitors to a website by specific time periods (e.g., hits per hour, hits per day, hits per month) or other events. In one or more implementations, the data tracker 102 can track all user interactions with the software component and cause the tracked data to be stored with the data storage manager 110. In one or more alternative embodiments the data generation system 100 may not include a data tracker 102. Rather the data generation system 100 can receive or retrieve tracking data from another system or component.

The data generation system 100 can also include a data decomposer 104 to facilitate the decomposition of data into one or more separate components. In particular, the data decomposer 104 can decompose a base dataset into a plurality of components, at least some of which can include time dependent characteristics of the base dataset. For example, the data decomposer 104 can determine one or more static components with time dependent characteristics and a base dynamic component from the base dataset.

In one or more embodiments, the data generation system 100 also includes a synthetic data generator 106. The synthetic data generator 106 can facilitate the generation of synthetic data from the base dataset. Specifically, the synthetic data generator 106 can generate a new (synthetic) dynamic component based on data that has been obtained by the data decomposer 104. For example, the synthetic data generator 106 can resample data from the base dynamic component of the base dataset to generate a new dynamic component. In one or more embodiments, the new dynamic component can include randomly resampled data based on the data in the base dynamic component.

The data generation system 100 can also include a data merger 108 to facilitate merging of components to form a synthetic dataset. In particular, the data merger 108 can merge the new dynamic component with one or more of the static components obtained from the base dataset to create the synthetic dataset. For example, the data merger 108 can merge the new dynamic component with a trend component and a seasonal component to obtain a synthetic dataset containing seasonal data. In another example, the data merger 108 can merge the new dynamic component with the trend component to obtain a synthetic dataset containing non-seasonal data.

As described above, the data generation system 100 can include a data storage manager 110 to facilitate storage of information for the data generation system 100. In particular data storage manager can store information used by one or more of the components of the data generation system 100 to facilitate the performance of various operations associated with synthetic data generation. In one or more embodiments as shown in FIG. 1, the data storage manager maintains trend information 111, seasonal information 112, base dynamic information 114, and synthetic dynamic information 116. The data storage manager may also store any additional or alternative information corresponding to the operation of the data generation system 100. The data storage manager can maintain additional or alternative data as may serve a particular implementation. The data storage manager may communicate with any component within the data generation system 100 to obtain or share information for predicting data associated with the data generation system 100. In one or more embodiments, the data storage manager includes one or more servers on which various types of data are stored. For example, the data storage manager may include or may be implemented in a data storage environment.

In one or more embodiments, the trend information 111 can include data representing one or more trends in the base dataset. More specifically, the trend information 111 can include a trend component that includes data with time-dependent characteristics. For example, the data can follow one or more trends associated with one or more sets of data points in the base dataset over a period of time. Trends can be associated with time periods that correspond to high levels of activity, low levels of activity, and/or other types of patterns in the base dataset. In one or more embodiments, the trends may correspond to long-term movement in time series data after other components are accounted.

The trend information 111 can provide useful information for showing changes in the data over time. Entities, such as business, can use trend information 111 to determine whether certain events or other reasons caused changes in the base dataset at certain points in time. In one or more implementations, carrying the trend information 111 over to the synthetic data can allow the data generation system 100 to potentially predict further trends in the time series data based on past trends from the base dataset.

According to one or more embodiments, the seasonal information 112 can include data representing the seasonality of the base dataset. In particular, the seasonal information 112 can include a seasonal component that includes data following cyclic seasonal variations or fluctuations associated with the dataset. For example, the seasonal component can represent data fluctuations over small time intervals (e.g., days, weeks, months or quarters) in a larger time period (e.g., a year). In many circumstances, the seasonality of the base dataset includes predictable movement in repetitive cycles around the trend component.

The seasonal information 112 can reflect temporary increases or decreases in activity according to the seasonal cycles. Specifically, the seasonal information 112 can help an entity determine whether movement in data is due to specific trends or regular cycles that occur based on the defined seasonal cycle. Entities can use the seasonal information 112 to plan for temporary increases and/or decreases in things like employee requirements, inventory, etc. Removing the seasonal component from the base dataset can help easily identify the movement in the data due to the changing of the seasons.

As mentioned, the data storage manager 110 can store base dynamic information 114. The base dynamic information 114 can include a base dynamic component associated with the dataset. Specifically, the base dynamic component can include remainder data that is obtained by decomposing the base dataset into a plurality of components and removing the trend information 111 and/or the seasonal information 112 (and other cyclic information, if applicable). In some examples, the base dynamic component can include data that does not correspond to any time dependent characteristics of the base dataset. The base dynamic component can include random characteristics (e.g., random fluctuations of time series data) or data that has a random appearance.

The data storage manager 110 can also store synthetic dynamic information 116. The synthetic dynamic information 116 can include a synthetic dynamic component generated based on the base dynamic component. In particular, the data generation system 100 can generate the synthetic dynamic information 116 to include random data that maintains one or more characteristics of the base dynamic component. For example, the synthetic dynamic component can include randomly resampled data points form the base dynamic component. In one or more embodiments, the randomly resampled data points can conform to a distribution constraint on the base dynamic component. The data generation system 100 generates the synthetic dynamic component in order to generate a subsequent synthetic dataset with similar characteristics as the base dataset.

Although the data storage manager depicted in FIG. 1 includes trend information 111, seasonal information 112, base dynamic information 114, and synthetic dynamic information 116, the data storage manager 110 can include additional or alternative information related to the data generation system 100, as previously mentioned. Additionally, the data storage manager can include information for other types of systems and processes. For example, the data storage manager 110 can manage a distributed storage space configured to interface with one or more systems in addition to the data generation system 100, allowing the different systems to interact with one another.

Figure 2:
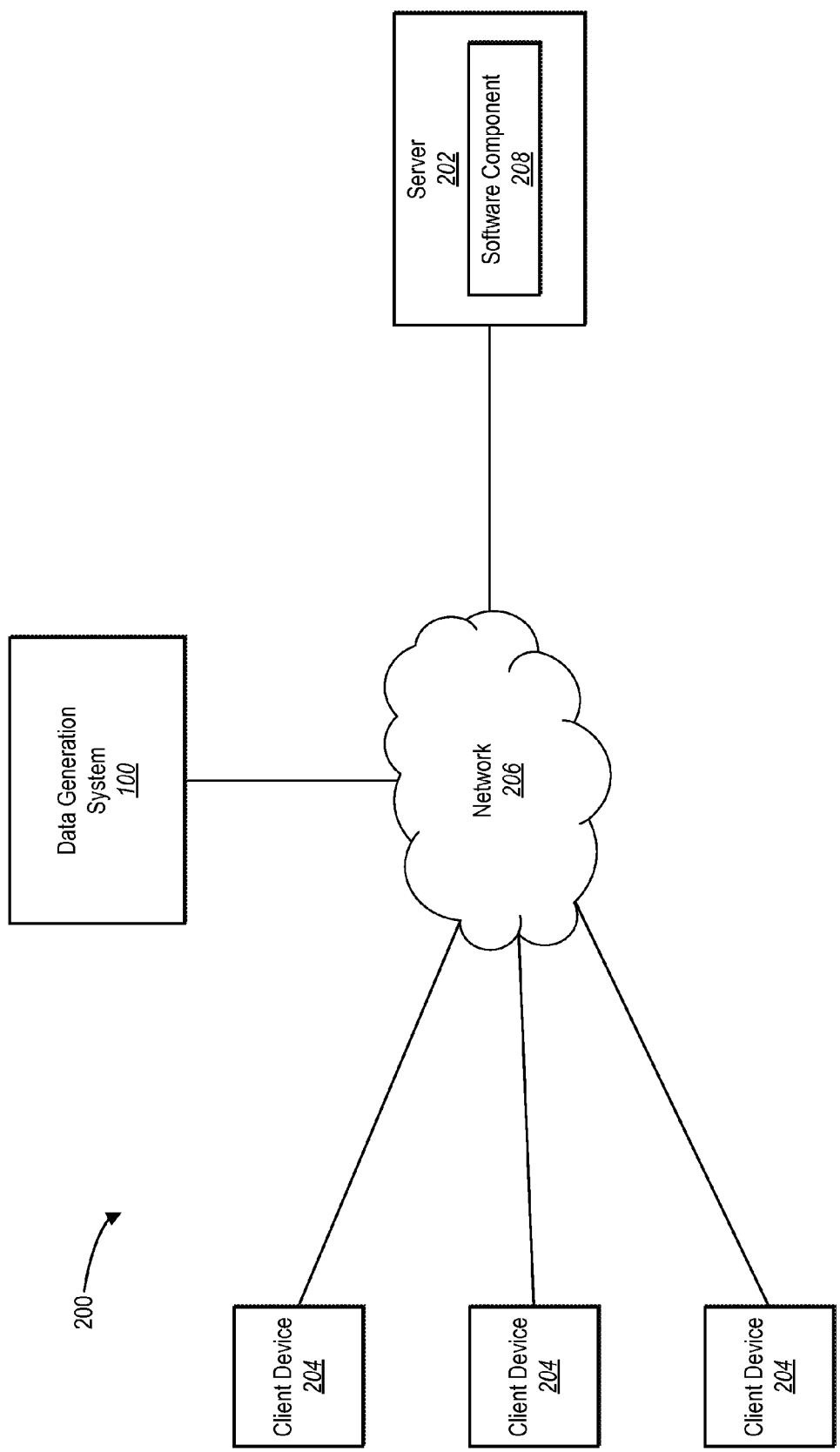
FIG. 2 illustrates a schematic diagram of an exemplary environment in which the data generation system of FIG. 1 can operate in accordance with one or more embodiments.

As previously mentioned, the data generation system 100 can generate synthetic data. FIG. 2 illustrates a schematic diagram of one embodiment of an exemplary environment 200 in which the data generation system 100 can operate. In one or more embodiments, the exemplary environment 200 includes a server 202 connected to a data generation system 100 and a plurality of client devices 204 via a network 206. Although the environment 200 of FIG. 2 is depicted as having various components, the environment 200 may have any number of additional or alternative components. For example, the environment 200 can be implemented on a single computing device with the data generation system 100.

Although FIG. 2 depicts the data generation system 100 in an environment 200, the data generation system 100 can facilitate the generation of synthetic data for one or more components in one or more different systems. For example, the data generation system 100 can generate data for a software component 208 running or accessible on a server 202. For example, the software component 208 can comprise an application stored at the server 202 and accessible by the client devices 204 via the network 206. Alternatively, the data generation system 100 can perform one or more synthetic data generation operations for other types or categories of media, including but not limited to web analytics, financial analytics, and/or other types of media.

In one or more embodiments, the server 202 can include a software component 208. In particular, the software component 208 can comprise an application running on the server 202 or a portion of a software application that can be downloaded from the server 202. For example, the software component 208 can include a web hosting application that allows the client devices 204 to interact with content hosted at the server 202. To illustrate, each of the client devices 204 can run separate instances of a web application (e.g., a web browser) to allow users to access, view, and/or interact with a website hosted at the server 202.

As previously described, the data generation system 100 can be implemented on one or more devices. For example, the data generation system 100 can include separate devices for performing one or more of the operations associated with data prediction. In one or more implementations, each of the devices can be in communication with the server 202 via the network 206. In an alternative implementation, at least some of the devices in the data generation system 100 may not be in communication with the server 202 via the network 206, but may communicate with a specific device in the data generation system 100 that is in communication with the server 202. In still further embodiments, the server 202 can implement the data generation system 100.

In one or more embodiments, the data generation system 100 can generate synthetic data for performing one or more operations in conjunction with the software component 208. In particular, the data generation system 100 can obtain data corresponding to the software component 208 from the server 202. To illustrate, the data generation system 100 can obtain a base dataset corresponding to one or more months of data representing user interactions with the software component 208 (e.g., traffic to a website hosted at the server 202, application downloads from the server 202, content requests from the sever 202, purchases from the server 202).

The server 202 may collect data for the base dataset during normal operation of the software component 208. For example, the server 202 can collect data for user interactions with the software component 208 and store the collected data in the base dataset to send to the data generation system 100. In one or more embodiments, the base dataset sent to the data generation system 100 includes one or more months of user interactions with the software component 208.

In alternative embodiments, the environment 200 can include a third party analytics system. In particular, the analytics system can be a third-party system that facilitates the collection of data and creation of the base dataset for one or more types of software components 208. In such instances, one or more servers 202 can establish one or more accounts with the data generation system 100 and the analytics system. The account(s) may allow the data generation system 100 to obtain the base dataset from the analytics system for a particular software component 208. In other embodiments, the data generation system 100 can track the data for the software component 208.

The data generation system 100 may use the data obtained from the server 202 to generate additional, synthetic data for use in predicting future data or for another operation. In one or more embodiments, generating additional data can extend the base dataset to include a much larger pool of data for predicting the future data. As mentioned previously, increasing the size of the data pool can improve the accuracy of the predictions because a greater number of resampled datasets can limit the impact of outliers, anomalies, and datasets with a small number of unique data points. Thus, one way of improving the accuracy of a particular set of predicted future data is to further increase the number of resampled datasets.

In one or more embodiments, the data generation system 100 can perform data generation operations for more than one software component 208. Specifically, the data generation system 100 can generate synthetic data for one or more types of software components 208. For example, the data generation system 100 can include a third-party system that can generate synthetic data for a plurality of different systems. To illustrate, the data generation system 100 can obtain base datasets for each of the plurality of different software components 208 by way of a third-party analytics system, as described above, from each of the servers 202 hosting the software components 208, or in any manner according to the implementation of a particular software component 208. Alternatively, the data generation system 100 can generate synthetic data for a single software component 208.

Figure 3:
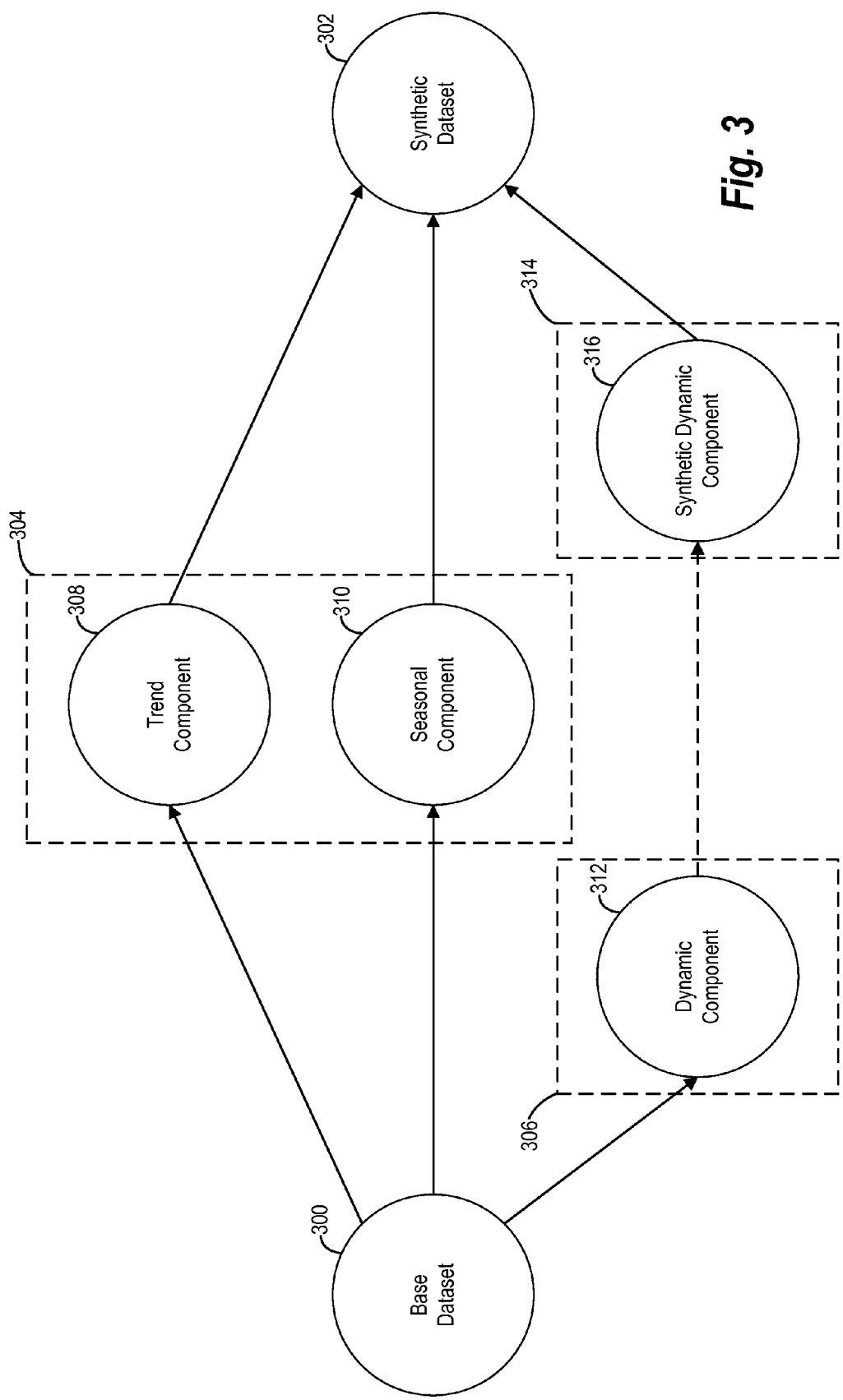
FIG. 3 illustrates a flow diagram of a method for generating a synthetic dataset from a base dataset in accordance with one or more embodiments.

As described above, the data generation system 100 can generate a synthetic dataset using a base dataset. FIG. 3 illustrates a flow diagram of a method for generating a synthetic dataset 302 from a base dataset 300. Although the base dataset 300 and the synthetic dataset of FIG. 3 include components representing particular characteristics of time series data, the base dataset 300 and the synthetic dataset can include components representing any type of characteristics associated with any type of data that can be decomposed into a plurality of components. Additionally, the base dataset 300 and the synthetic dataset can each include any number of data points or any amount of data as may serve a particular embodiment.

In one or more embodiments, the data generation system 100 may determine the amount of data in the base dataset 300 based on an intended use for the synthetic dataset. For example, the data generation system 100 may be generating the synthetic dataset for use in forecasting or predicting future data based on the base dataset 300. To illustrate, the base dataset 300 may include data describing hits to a website for a particular period of time, and the predicted future data may include predictions for hits to the website for a particular future period of time.

The synthetic dataset may allow the data generation system 100 to perform various operations, including predicting future data for the base dataset 300. To accurately predict future data for the base dataset 300, the data generation system 100 can expand the base dataset 300 for use in data prediction algorithms. Specifically, the base dataset 300 may include a limited amount of usable data (e.g., based on limited availability, limited resources, privacy/confidentiality concerns or other limitations) that may not allow for the accurate prediction of the future data. Increasing the amount of data available can increase the accuracy of the predicted future data.

In other embodiments, the data generation system 100 can use the synthetic dataset to perform other operations. For example, the data generation system 100 can simulate data under other conditions based on the data in the base dataset 300. The data generation system 100 can introduce additional data into the synthetic dataset using the decompose-merge model for the corresponding conditions.

According to one or more embodiments, the data generation system 100 can generate the synthetic dataset 302 based on the base dataset 300. In particular, the data generation system 100 can split or decompose the base dataset 300 into a plurality of components. For example, the data generation system 100 can decompose the base dataset 300 using a model that decomposes the base dataset 300 into static information 304 and dynamic information 306. For example, the model can extract a trend component 308, a seasonal component 310 (if the base dataset 300 includes seasonal data), and a base dynamic component 312 from the base dataset 300. To illustrate, the model can comprise a decompose-merge model to decompose the base dataset 300 into the plurality of components 308, 310, 312.

In one or more implementations, the decompose-merge model can include an additive model represented as:

$$O_t = T_t + S_t + R_t,$$

where $O_t$ represents the real time series (the base dataset 300), $T_t$ represents the trend component 308, $S_t$ represents the seasonal component 310 (if applicable), and $R_t$ represents the random component (the base dynamic component 312). In alternative implementations, the decompose-merge model can include a multiplicative model represented as:

$$O_t = T_t \times S_t \times R_t.$$

The data generation system 100 can determine whether to use the additive model or the multiplicative model based on the type of data in the base dataset 300. For example, the additive model can be useful for data in which the seasonality of the base dataset 300 is relatively constant over time. The multiplicative model can be useful when the seasonality of the base dataset 300 increases over time. The data generation system 100 can use other criteria for determining whether to use the additive model or the multiplicative model, as may serve a particular embodiment.

In the embodiment of FIG. 3, the data generation system 100 decomposes the base dataset 300 into a plurality of components using an additive decompose-merge model. In particular, the data generation system 100 can decompose the base dataset 300 into static information 304 and dynamic information 306. For example, the static information 304 can include the trend component 308 and the seasonal component 310 (if applicable), and the base dynamic information can include a base dynamic component 312. In one or more embodiments, the data generation system 100 can decompose the base dataset 300 into additional or alternative components based on the composition of data in the base dataset 300.

According to one or more embodiments, the data generation system 100 can use an algorithm to smooth the base dataset 300 to obtain the trend component 308. In particular, the data generation system 100 can use a smoothing algorithm to remove or isolate the trend component 308 from the base dataset 300. For example, the smoothing algorithm can include a moving average algorithm, an exponential smoothing algorithm, or any algorithm that allows the data generation system 100 to remove or decompose the trend component 308 from the base dataset 300.

Along similar lines, the data generation system 100 can use an algorithm to obtain the seasonal component 310. Specifically, the data generation system 100 can use a de-trend algorithm to remove or isolate the seasonal component 310 from the base dataset 300. For example, the de-trend algorithm can estimate the seasonal component 310 by subtracting the trend component 308 from the base dataset 300. In one or more embodiments, the data generation system 100 uses a de-trend algorithm represented as:

$$S_t + R_t = O_t - T_t.$$

The seasonal component 310 can represent cycles of different lengths. For example, the seasonal component 310 can represent the seasonal effect for each month of the year. In an alternative example, the seasonal component 310 can represent the effect for each quarter of a year. One method of estimating such effects includes averaging the result of the de-trend algorithm for a specific season or time of year.

In one or more embodiments, the data generation system 100 can use an algorithm to obtain the base dynamic component 312. In particular, the data generation system 100 can use an algorithm to remove or isolate the base dynamic component 312 from the base dataset 300. For example, the data generation system 100 can subtract the trend component 308 and the seasonal component 310 from the base dataset 300 to obtain the base dynamic component 312 as represented by:

$$R_t = O_t - T_t - S_t.$$

After decomposing the base dataset 300 into a plurality of components, each representing different characteristics of the data in the base dataset 300, the data generation system 100 can generate new dynamic information 314. In one or more implementations, the base dynamic component 312 is the component of the base dataset 300 that affects change in the resulting synthetic dataset. In one or more embodiments, the data generation system 100 generates a synthetic dynamic component 316 based on the base dynamic component 312. For example, the data generation system 100 can randomly resample the base dynamic component 312 to create the synthetic dynamic component 316. Alternatively, the data generation system 100 can generate the synthetic dynamic component 316 based on characteristics associated with the base dynamic component 312.

According to one or more embodiments, the data generation system 100 can generate the synthetic dataset 302 after generating the synthetic dynamic component 316. In particular, the data generation system 100 can merge the static information 304 with the new dynamic information 314 to create the synthetic dynamic component 316. For example, the data generation system 100 can merge the trend component 308, the seasonal component 310 (if applicable), and the synthetic dynamic component 316 to generate the synthetic dataset 302. By merging the static information 304 with the new dynamic information 314, the data generation system 100 can generate a synthetic dataset having at least some of the time-dependent characteristics of the base dataset 300, which can be useful in extending an available pool of data for predicting future data or for performing other types of operations on the base dataset 300 or similar data.

In one or more embodiments, merging the plurality of components to obtain the synthetic dataset can include utilizing an additive-merge algorithm. In particular, the data generation system 100 generates the synthetic dataset by merging the synthetic dynamic component 316 with the trend component 308 and the seasonal component 310 (if applicable). In one example, the merge algorithm can merge the static components with the synthetic dynamic component 316 in the additive merge algorithm represented as:

$$S_{ti}=T_{ti}+S_{ti}+NR_{ti},\ i=1,2,3,\ldots$$

where $S_{ti}$ represents the synthetic dataset, and $NR_{ti}$ represents the new dynamic component generated based on the base dynamic component 312.

Figure 4:
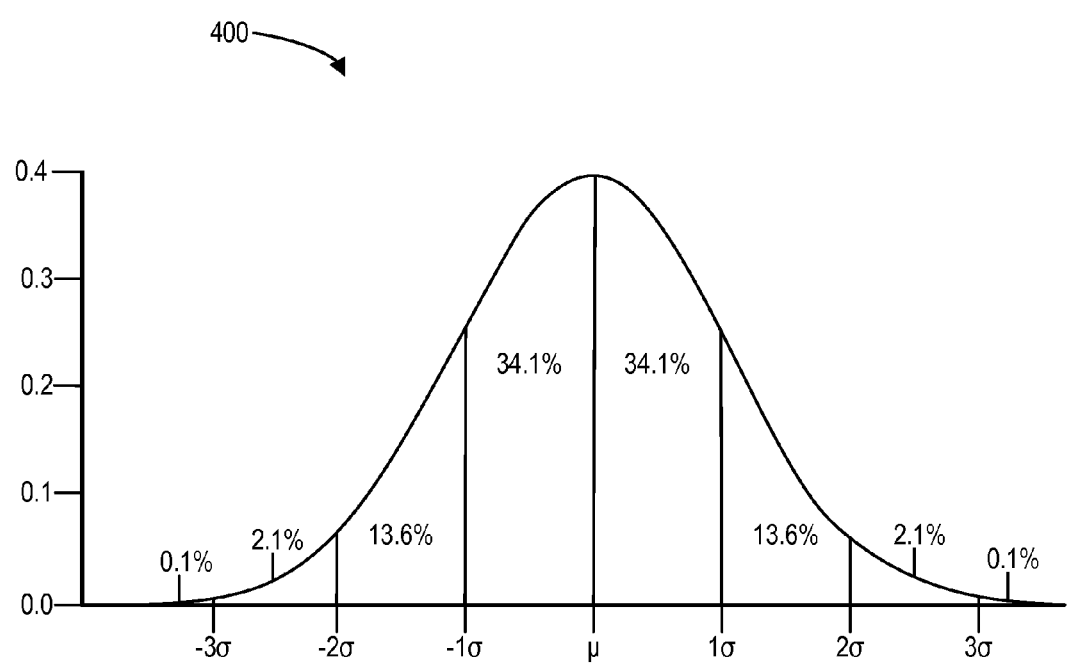
FIG. 4 illustrates a graph diagram of a normal distribution for the base dataset of FIG. 3 in accordance with one or more embodiments.

As previously described, the synthetic dataset can include one or more of the time-dependent characteristics of the base dataset 300 by carrying the static components 304 over from the base dataset 300 to the synthetic dataset 302. Additionally, the synthetic dataset includes a new, synthetic dynamic component 316 based on the base dynamic component 312. FIG. 4 illustrates a graph diagram of a normal distribution 400 for the base dataset 300 of FIG. 3. Although the graph diagram of FIG. 4 depicts a normal distribution 400, the data generation system 100 can generate the synthetic dynamic component 316 based on any type of distribution or other criteria.

In one or more embodiments, the data generation system 100 generates the synthetic dynamic component 316 according to a particular distribution of the base dataset 300. In particular, the data generation system 100 generates the synthetic dataset by resampling data from the base dynamic component 312 by following the normal distribution 400 of the base dataset 300. For example, the data generation system 100 can analyze the base dynamic component 312 to determine the mean and variance of the base dynamic component 312:

$$R_r \sim (\mu, \sigma^2)$$

where $\mu$ represents the mean of the base dynamic component 312, and $\sigma^2$ represents the variance of the base dynamic component 312.

According to one or more embodiments, the data generation system 100 generates the synthetic dynamic component 316 by following the normal distribution 400 and resampling the data from the base dataset 300 according to the three-sigma rule for the normal distribution 400. The three-sigma rule states that almost all values in the base dataset 300 are within three standard deviations of the mean in the normal distribution 400. For example, approximately 68.27% of the data points are within one standard deviation (i.e., from $-1\sigma$ to $1\sigma$ in FIG. 4), approximately 95.45% of the data points are within two standard deviations of the mean (i.e., from $-2\sigma$ to $2\sigma$), and approximately 99.73% of the data points are within three standard deviations of the mean (i.e., from $-3\sigma$ to $3\sigma$). To illustrate, the data generation system 100 can randomly select nearly all of the data points from within one, two or three standard deviations of the mean (in both negative and positive directions) to construct the new random component. By applying the three-sigma rule when resampling data from the base dynamic component 312 to create the synthetic dynamic component 316, the data generation system 100 can retain at least some of the properties from the base dynamic component 312 in the synthetic dynamic component 316 while introducing new randomness into the synthetic dynamic component 316.

As described previously, the data generation system 100 can generate synthetic data from a base data set including seasonal or non-seasonal data. FIGS. 5A-5E illustrate graph diagrams of data corresponding to a non-seasonal dataset. Although the graph diagrams of FIG. 5A-5E depict a base dataset 500 as having specific static information and dynamic information, the base dataset 500 can have any amount and/or types of data with associated static information and dynamic information.

Figure 5A:
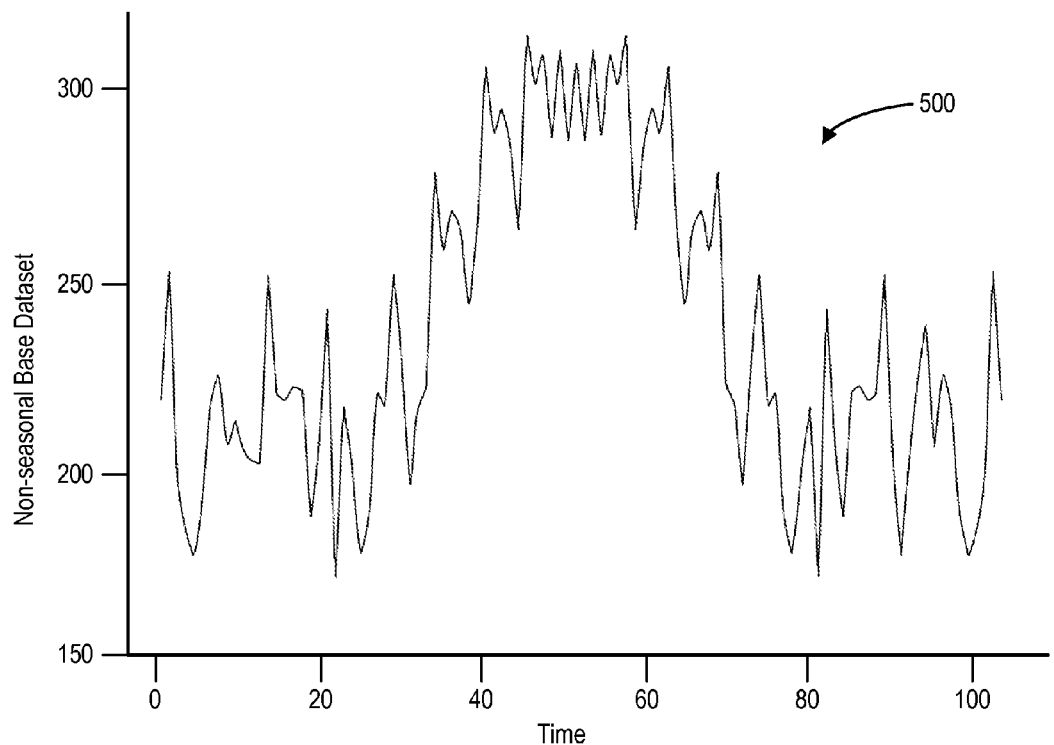
FIGS. 5A-5E illustrate graph diagrams of data corresponding to a non-seasonal dataset in accordance with one or more embodiments.
Figure 5B:
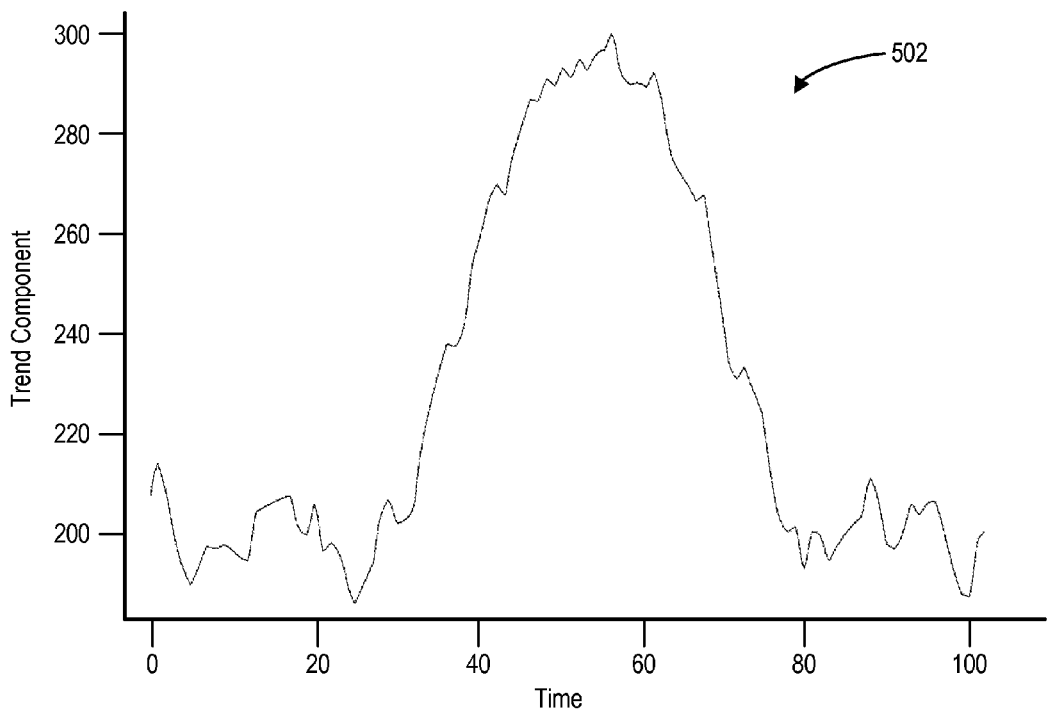

FIG. 5A illustrates a base dataset 500 for the non-seasonal dataset. The base dataset 500 of FIG. 5A includes a plurality of rises and falls corresponding to different characteristics associated with the base dataset 500. Specifically, some of the rises and falls correspond to time dependent characteristics, while other changes correspond to trend information 111 associated with the base dataset 500. For example, the trend information 111 can represent the changes in visitor traffic to a website that correlates to different events associated with the website. To illustrate, a product launch on the website may result in an increase in traffic or high traffic for a certain amount of time, followed by a decrease in traffic as the novelty of the product decreases.

Decomposing the base dataset 500 into a plurality of components allows the data generation system 100 to determine the trend component 502 (shown in FIG. 5B) and the base dynamic component 504 (shown in FIG. 5C) from the base dataset 500. As depicted, the trend component 502 represents the long-term movement of the data in the base dataset 500. For example, the trend component 502 can represent the increase in visitor traffic to the commercial website in response to an important announcement (e.g., a product launch, an update), a news report about the website, or some other event that results in a change in the visitor traffic.

In addition to allowing the data generation system 100 to retain the trend information 111 in the synthetic dataset, the data generation system 100 can present the trend component 502 and/or any of the other components or datasets to a user, for example, in a graphical user interface. Presenting the trend component 502 and/or other components or datasets in the graphical user interface can allow the user to view the trend information 111 to determine when and why an increase or decrease in the data occurred. For example, the user can determine that an increase or decrease occurred in conjunction with a specific event, as described above.

Figure 5C:
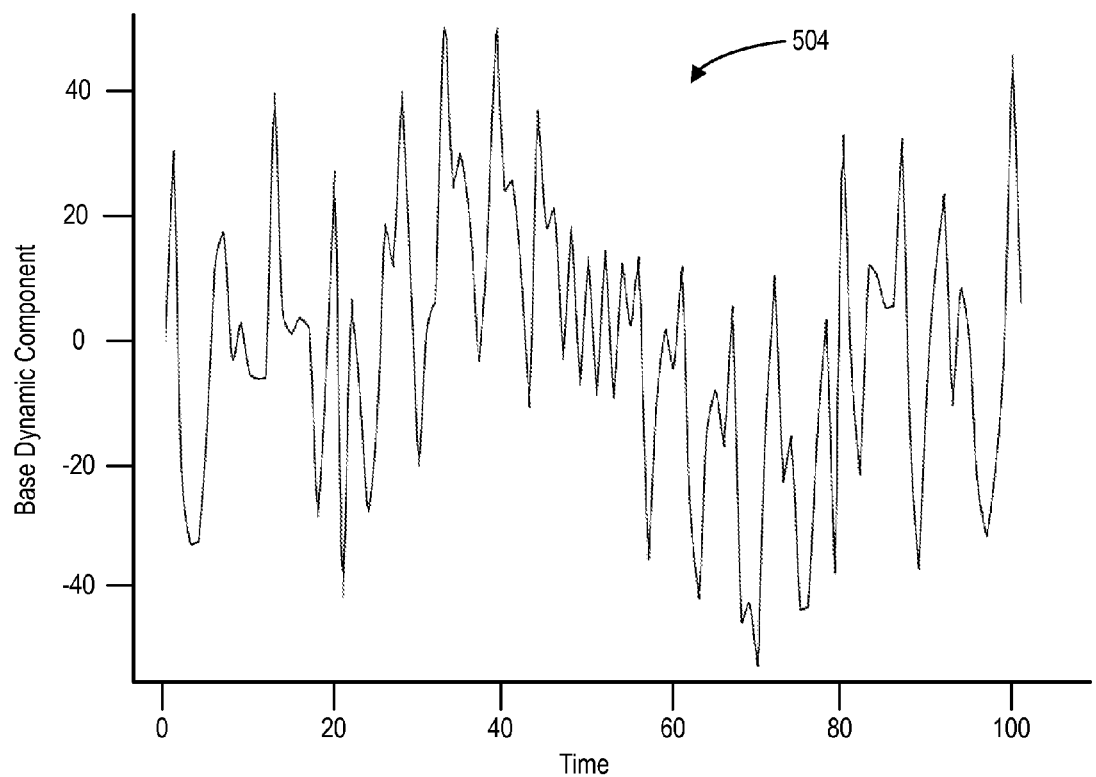

The data generation system 100 can also obtain the base dynamic component 504 from the base dataset 500. The base dynamic component 504 of FIG. 5C depicts randomness in the data (or data having the appearance of randomness) from with the base dataset 500. The randomness may account for some, many or all of the increases and decreases in the base dataset 500.

Figure 5D:
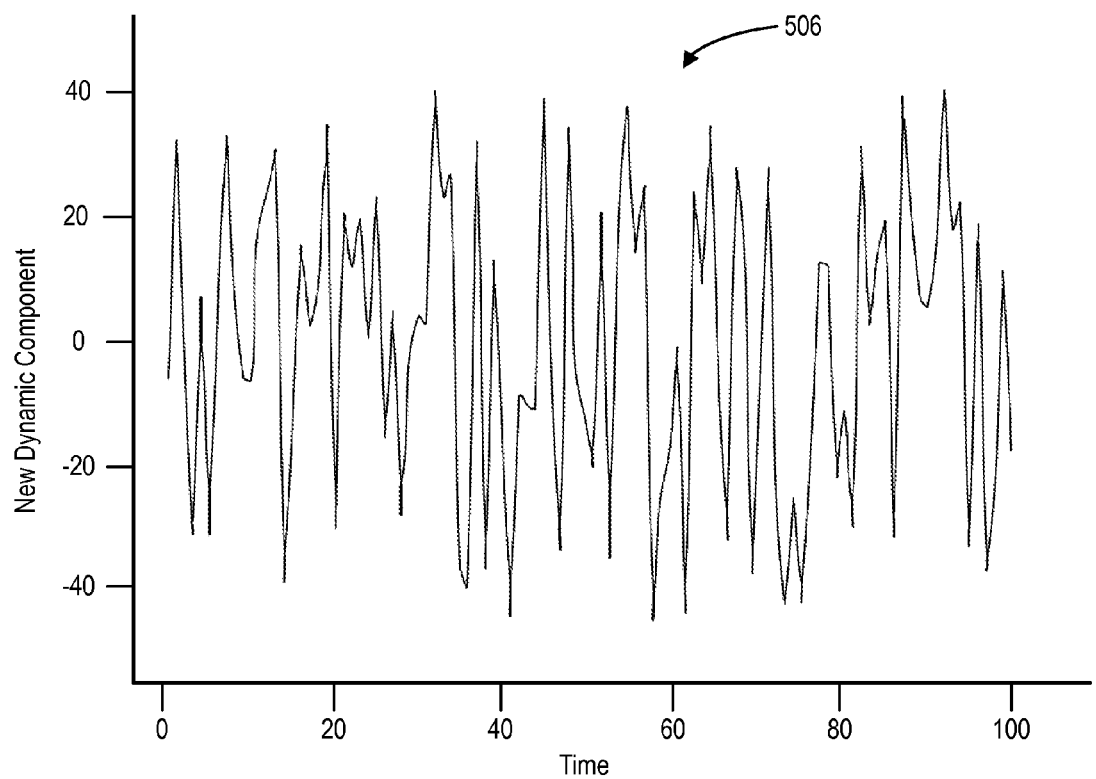

Because the base dynamic component 504 includes the random data/elements of the base dataset 500, the data generation system 100 can replace the base dynamic component 504 with new dynamic information to generate a new dataset that has many of the same characteristics as the base dataset 500. The data generation system 100 can generate a synthetic dynamic component 506 from the base dynamic component 504, as shown in FIG. 5D. As illustrated, the synthetic dynamic component 506 includes data that follows the normal distribution corresponding to the base dynamic component 504. Specifically, the data resampled from the base dynamic component 504 to the synthetic dynamic component 506 is selected based on the three-sigma rule for the mean and variance corresponding to the base dynamic component 504.

Figure 5E:
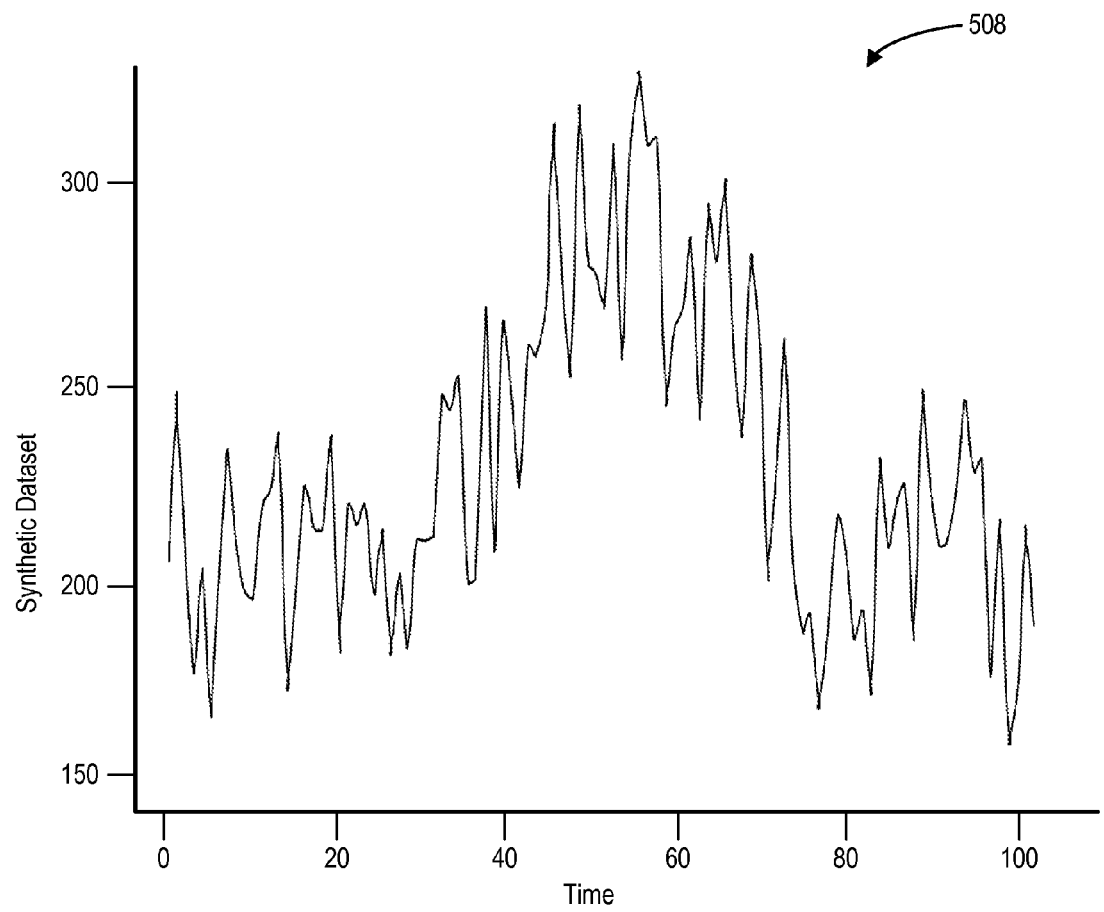

After generating the synthetic dynamic component 506, the data generation system 100 can merge the synthetic dynamic component 506 with the trend component 502 to create the synthetic dataset 508. FIG. 5E illustrates a synthetic dataset 508 generated by the data generation system 100 based on the base dataset 500. The synthetic dataset 508 includes at least some of the characteristics corresponding to the base dataset 500. For example, the synthetic dataset 508 includes the trend component 502 from the base dataset 500, as illustrated by the long-term movement of the data in the synthetic dataset 508 that correlates to the long-term movement of the data in the base dataset 500. The synthetic dynamic component 506 modifies the short-term movement of the data in the synthetic dataset 508, and is distinguishable from the short-term movement of the data in the base dataset 500 caused by the base dynamic component 504.

Figure 6A:
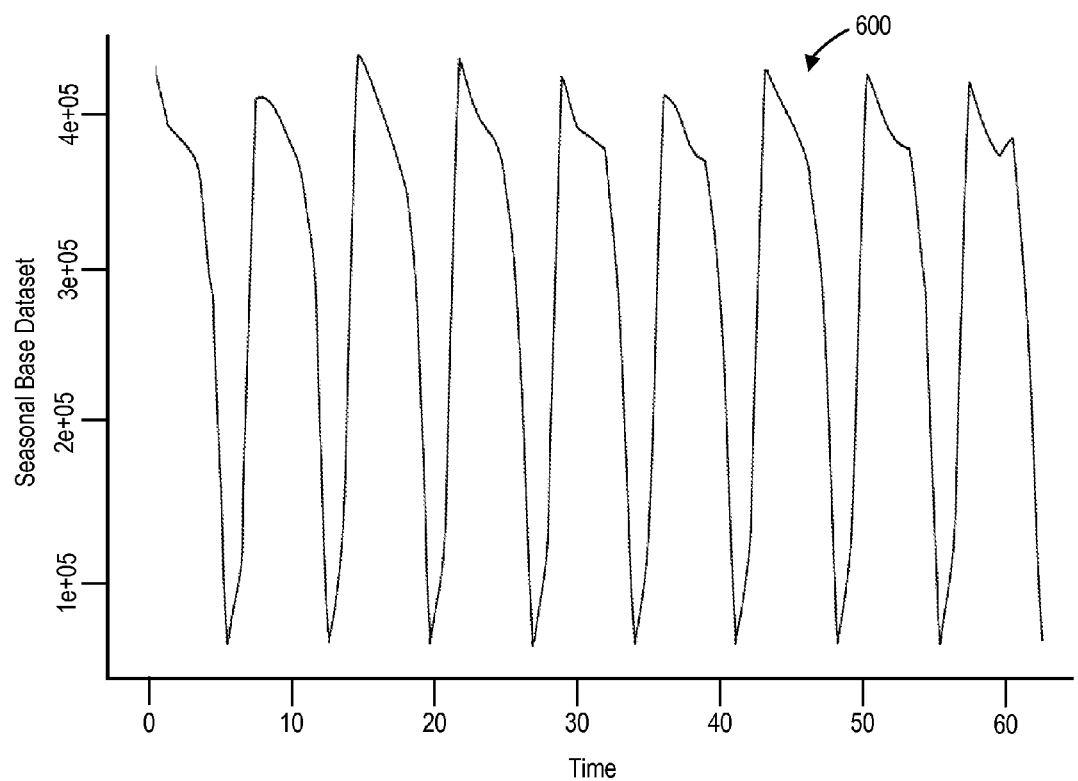
FIGS. 6A-6F illustrate graph diagrams of data corresponding to a seasonal dataset in accordance with one or more embodiments.

FIGS. 6A-6F illustrate graph diagrams of data corresponding to a seasonal dataset. FIG. 6A illustrates a base dataset 600 that includes seasonal data. Because the base dataset 600 includes seasonal data, the data generation system 100 can decompose the base dataset 600 into three components: the seasonal component 602, the trend component 604, and the base dynamic component 606. The seasonal component 602 and the trend component 604 can make up the static information for the base dataset 600, and the base dynamic component 606 can make up the dynamic information for the base dataset 600. In one or more embodiments, the data generation system 100 can obtain each of the components using the additive decomposition-merge model, as described previously.

Figure 6B:
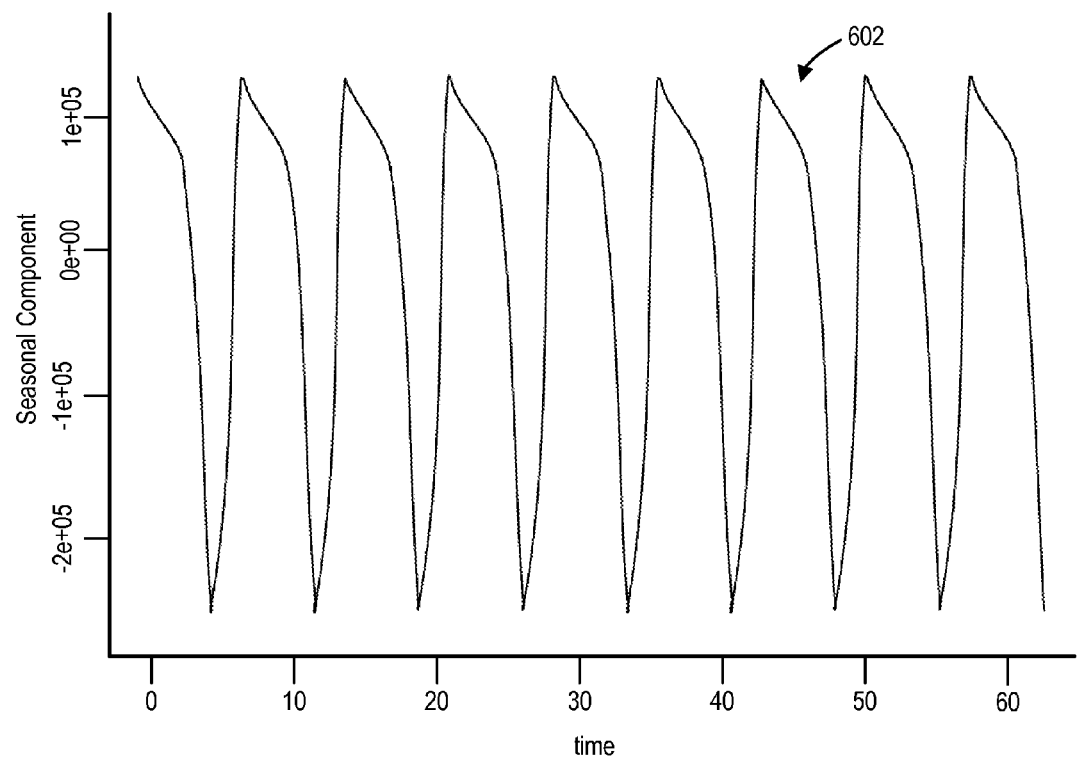

FIG. 6B illustrates the seasonal component 602 of the base dataset 600. The seasonal component 602 may include data that fluctuates according to specific time periods. For example, the seasonal component 602 can include data with visible fluctuations in the data, each fluctuation corresponding to a day, a week, seasons, or any fixed or known time period. To illustrate, visitor traffic to a website can fluctuate based on the time of day (e.g., lower traffic at night and peak traffic during certain times of the day). Because the fluctuations occur for fixed or known periods of time, the fluctuations can be relatively consistent from one time period to the next and form a predictable pattern.

Removing the seasonal component 602 from the base dataset 600 can allow a user to more easily determine certain characteristics of the base dataset 600. In particular, because the seasonal component 602 may include a number of fluctuations that may be large compared to other variations in the data caused by the trend component 604 and the base dynamic component 606, removing the seasonal component 602 may allow the user to more easily discern long-term changes and other short-term changes in the data. For example, the amount of variation within a single seasonal cycle may be difficult to discern when combined with the seasonal component 602, but may be easily discernable with the seasonal component 602 removed.

Figure 6C:
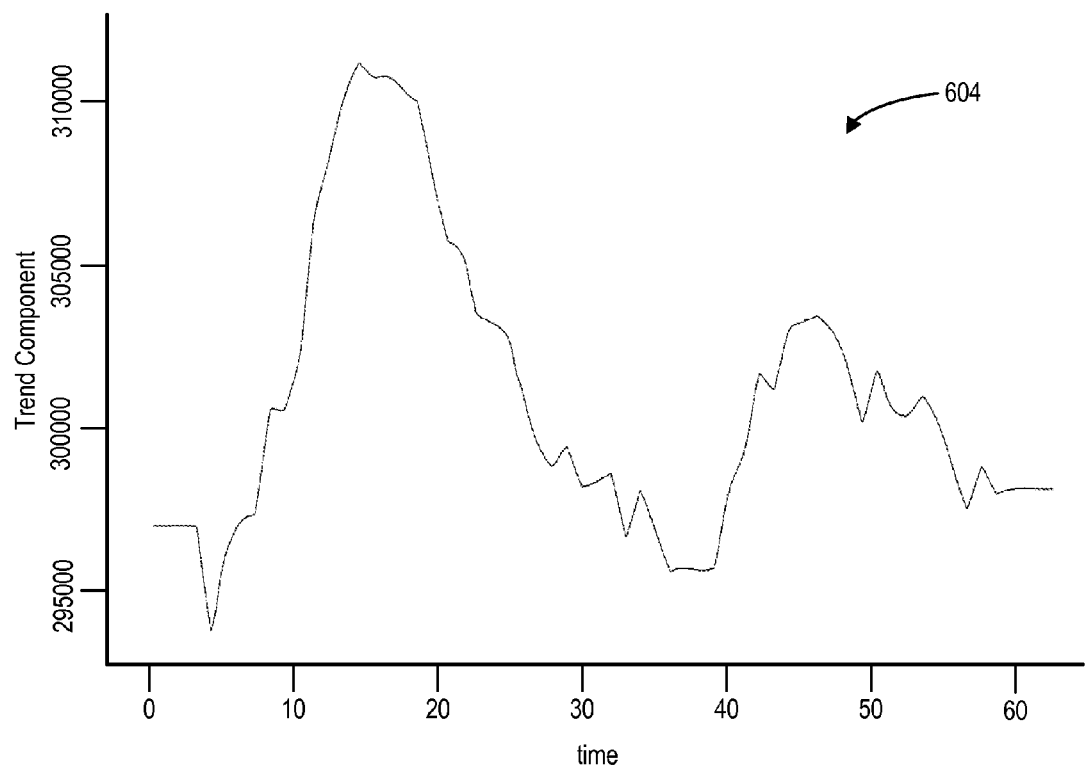
Figure 6D:
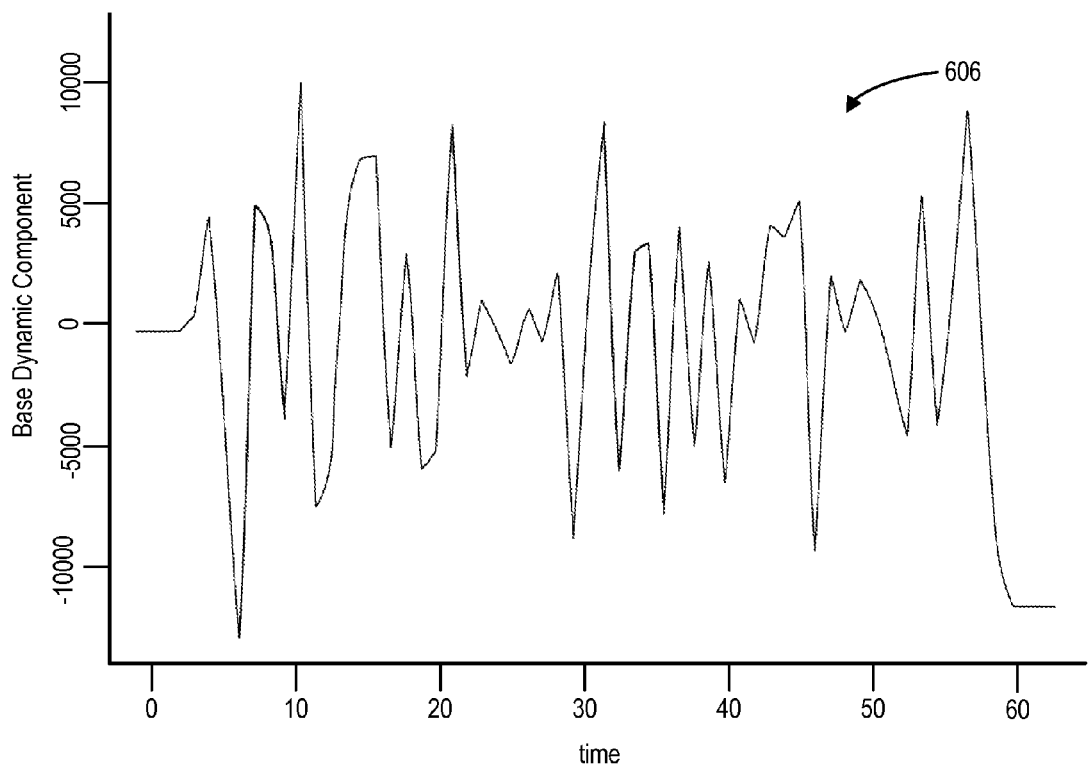

Additionally, the data generation system 100 can determine the trend component 604 from the base dataset 600. FIG. 6C illustrates the trend component 604 of the base dataset 600, as determined by the data generation system 100. The trend component 604 represents the long-term movement of the data in the base dataset 600. As illustrated, the trend component 604 can be more easily discerned when the seasonal component 602 and the base dynamic component 606 are removed from the base dataset 600.

The data generation system 100 can also obtain the base dynamic component 606 from the base dataset 600. The base dynamic component 606 of FIG. 6D can represent randomness in the data (or data having the appearance of randomness) from with the base dataset 600. The data generation system 100 determines the base dynamic component 606 by removing the seasonal component 602 and the trend component 604 (and any other cyclic components that may be associated with the base dataset 600). The randomness may account for at least some of the increases and decreases in the base dataset 600.

Figure 6E:
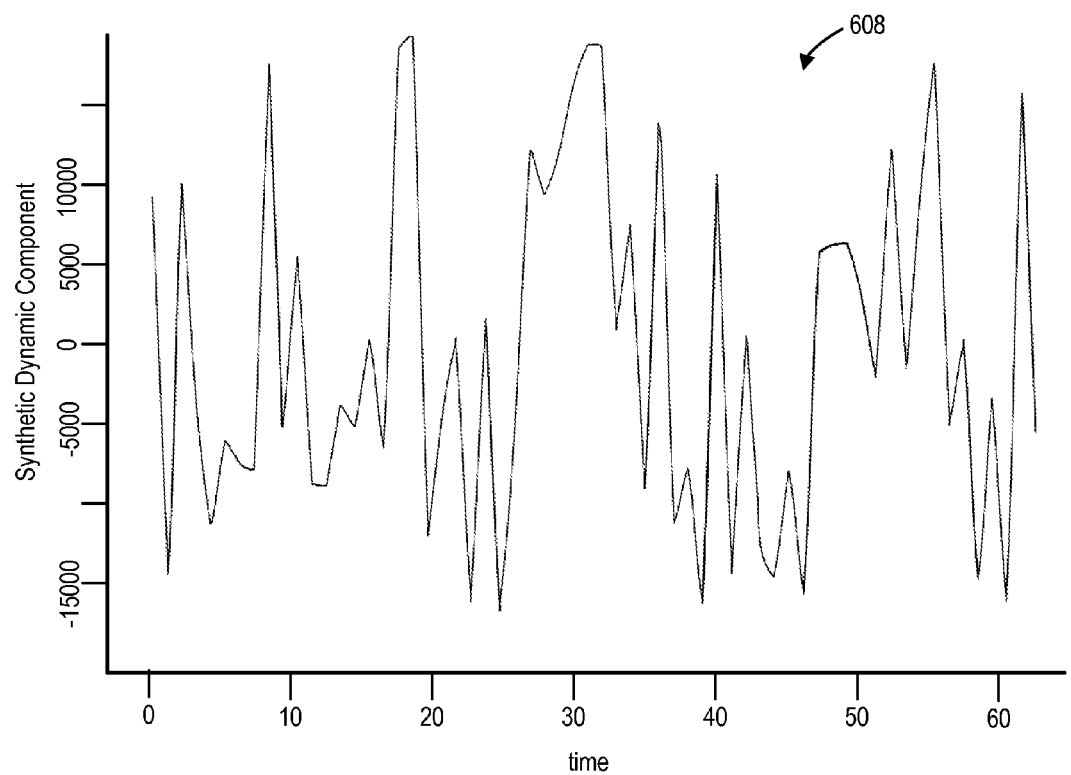

Because the base dynamic component 606 includes the random data/elements of the base dataset 600, the data generation system 100 can replace the base dynamic component 606 with new dynamic information to generate a new dataset that has many of the same characteristics as the base dataset 600. Specifically, the data generation system 100 can generate a synthetic dynamic component 608 from the base dynamic component 606, as shown in FIG. 6E. As illustrated, the synthetic dynamic component 608 includes data that follows the normal distribution corresponding to the base dynamic component 606. In particular, the data resampled from the base dynamic component 606 to the synthetic dynamic component 608 is selected based on the three-sigma rule for the mean and variance corresponding to the base dynamic component 606.

Figure 6F:
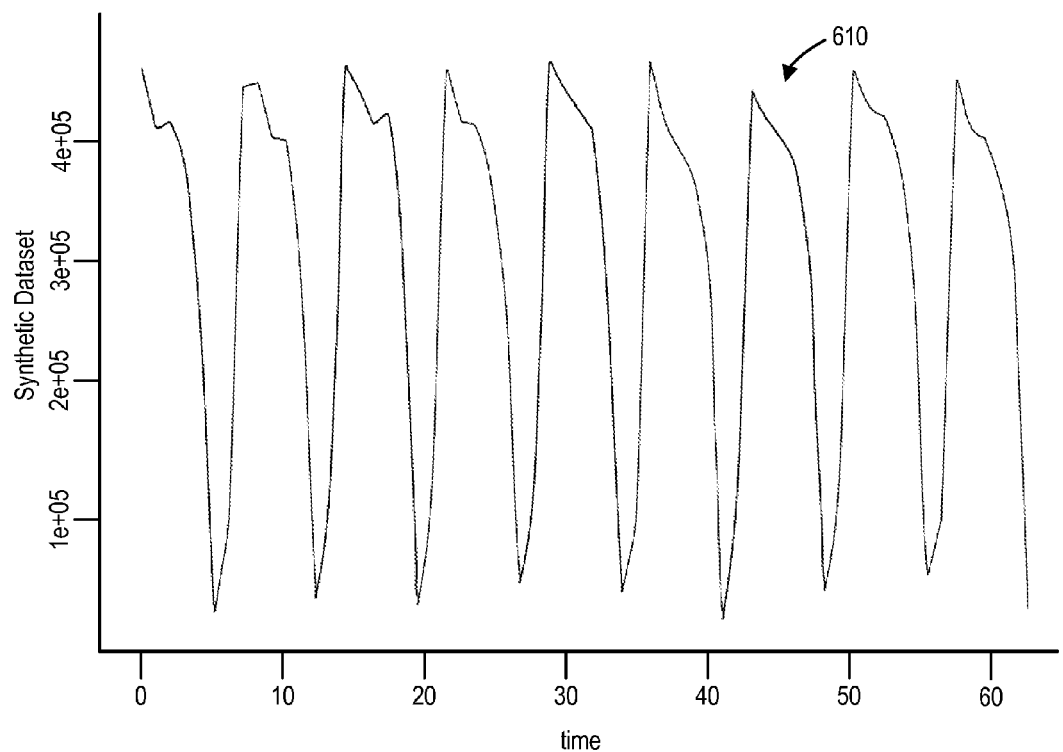

After generating the synthetic dynamic component 608, the data generation system 100 can merge the synthetic dynamic component 608 with the trend component 604 and the seasonal component 602 to create the synthetic dataset 610. FIG. 6F illustrates a synthetic dataset 610 generated by the data generation system 100 based on the base dataset 600. The synthetic dataset 610 includes at least some of the characteristics corresponding to the base dataset 600. For example, the synthetic dataset 610 includes the trend component 604 and the seasonal component 602 from the base dataset 600, as illustrated by the long-cyclic movement and gradual long-term movement of the data in the synthetic dataset 610. The synthetic dynamic component 608 modifies the short-term movement of the data in the synthetic dataset 610 (e.g., at the peaks of the seasonal cycles), and is distinguishable from the short-term movement of the data in the base dataset 600 caused by the base dynamic component 606.

Figure 7A:
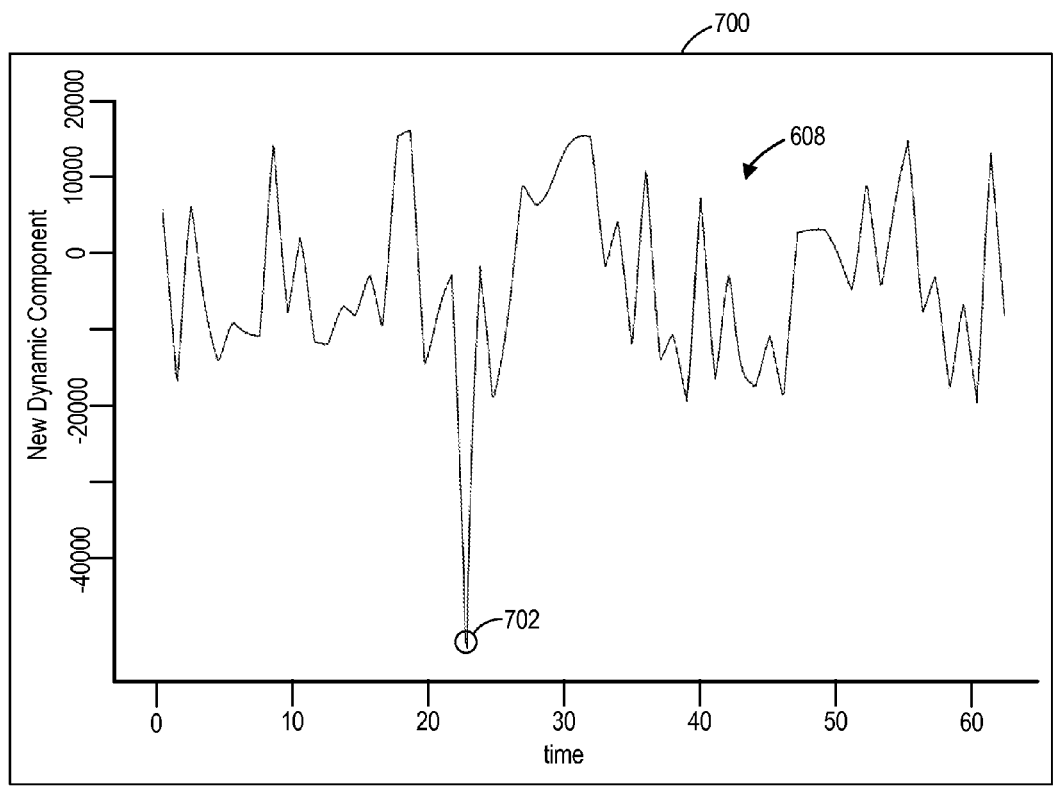
FIGS. 7A-7B illustrate graph diagrams of anomaly detection testing for the seasonal dataset of FIGS. 6A-6F in accordance with one or more embodiments.
Figure 7B:
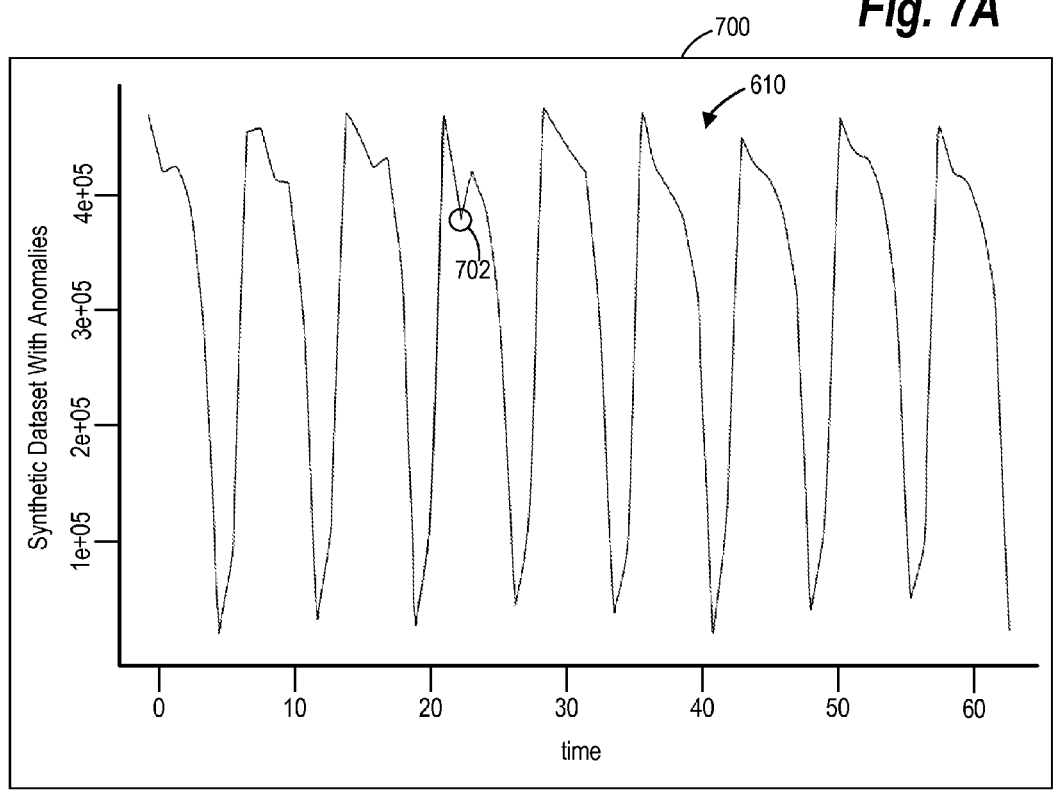

As previously mentioned, the data generation system 100 can present at least some of the components and/or datasets in a graphical user interface to a user. In one or more embodiments, presenting information to the user in the graphical user interface allows the user to verify the accuracy of the decompose-merge model or to perform other operations with the data (e.g., anomaly detection, injecting additional or alternative data into the synthetic dataset 610). FIGS. 7A-7B illustrate graph diagrams of anomaly detection testing for the seasonal dataset of FIGS. 6A-6F. Although FIGS. 7A-7B depict anomaly detection testing for the seasonal dataset of FIGS. 6A-6F, the data generation system 100 can allow a user to perform anomaly detection testing for any seasonal or non-seasonal datasets. Additionally or alternatively, the data generation system 100 can allow the user to perform other types of operations with respect to any of the datasets.

In one or more embodiments, the data generation system 100 can present the synthetic dynamic component 608 to the user in the graphical user interface 700. The graphical user interface 700 can allow the user to manipulate the view of the synthetic dynamic component 608. For example, the user can zoom in or out in the graphical user interface 700 to focus on a shorter or a longer time period, respectively, for the synthetic dynamic component 608. In another example, the user can scroll horizontally or vertically within the graphical user interface 700 to view different sections of the synthetic dynamic component 608, particularly if the entire synthetic dynamic component 608 is not visible within the graphical user interface 700.

In one or more embodiments, the data generation system 100 can allow the user to modify the synthetic dynamic component 608. In particular, the user can manually alter the data in the synthetic dynamic component 608. For example, the user can adjust a data point in the synthetic dynamic component 608 by selecting the data point and dragging the data point in a vertical direction to a new position on the vertical axis, giving the selected data point a new value. To illustrate, the graphical user interface 700 may allow the user to select the data point using a cursor (e.g., selecting a visible handle for the data point with a mouse). Moving the cursor up or down along the vertical axis moves the data point with the cursor.

According to one or more embodiments, the data generation system 100 may restrict the amount of movement that the user can apply to a data point. For example, the data generation system 100 can limit the movement to a range of values relative to the vertical axis or relative to the other data points in the synthetic dynamic component 608. To illustrate, the data generation system 100 can limit the user to adjusting data points while still maintaining the normal distribution corresponding to the base dynamic component 606. Allowing the user to adjust data points within the normal distribution may allow the user to introduce greater variety into the synthetic dataset 610. Alternatively, the data generation system 100 can limit the user to adjusting data points to particular vertical values (e.g., an upper bound and a lower bound) for a particular data point.

Adjusting the data points in the synthetic dynamic component 608 can allow the user to verify the accuracy of the decompose-merge model. Specifically, injecting an anomaly 702 into the synthetic dynamic component 608 allows the user to view how the decompose-merge model handles the anomaly 702 in generating the synthetic dataset 610. For example, after the decompose-merge model generates the synthetic dataset 610, the data generation system 100 can present the synthetic dataset 610 including the anomaly 702 in the graphical user interface 700, as illustrated in FIG. 7B. An anomaly 702 includes any value that lies beyond three standard deviations of the mean, represented as:

$$ANR_{ti} < \mu - 3\sigma$$

$$ANR_{ti} > \mu + 3\sigma, i=1,2,3, \ldots$$

where $ANR_{ti}$ represents an anomalous value of the synthetic dynamic component 608.

In some instances, the data generation system 100 can present the anomaly 702 in the synthetic dataset 610 in any manner. In particular, the data generation system 100 can highlight the anomaly 702 so that the user may easily identify the anomaly 702 in the synthetic dataset 610. For example, the data generation system 100 can create a circle or other shape around the particular data point corresponding to the anomaly 702, present a different color for the data point or lines connecting to the data point, or use any other method of highlighting the anomaly 702 for quick and easy identification of the anomaly 702 in the synthetic dataset 610 by the user. By presenting the anomaly 702 to the user in the synthetic dataset 610 within the graphical user interface 700, the data generation system 100 can allow the user to verify the accuracy of the decompose-merge model and apply any changes to the decompose-merge model if necessary or desired.

In addition to manual anomaly injection, the data generation system 100 can perform other operations on the synthetic dynamic component 608 in the graphical user interface 700. Specifically, the data generation system 100 can allow the user to adjust the statistical properties of the synthetic dynamic component 608. For example, the data generation system 100 can allow the user to adjust the variance or mean of the synthetic dynamic component 608 prior to merging the synthetic dynamic component 608 with other components to generate the synthetic dataset 610. Additionally or alternatively, the data generation system 100 can allow the user to adjust the smoothing of the synthetic dynamic component 608 or of other components in the base dataset.

In other implementations, the data generation system 100 can allow the user to generate additional or alternative synthetic dynamic components 608. In particular, the data generation system 100 can allow the user to generate a new synthetic dynamic component 608 if the user determines that the synthetic dynamic component 608 is not acceptable for any reason. For example, the user can determine that the synthetic dynamic component 608 too closely resembles the base dynamic component 606, or does not appear to have enough randomness in the data points.

FIGS. 1-7B, the corresponding text, and the examples, provide a number of different systems and devices for generating synthetic data. In addition to the foregoing, embodiments of the present invention also can be described in terms of flowcharts comprising acts and steps in a method for accomplishing a particular result. For example, FIGS. 8 and 9 illustrate flowcharts of exemplary methods in accordance with one or more embodiments.

Figure 8:
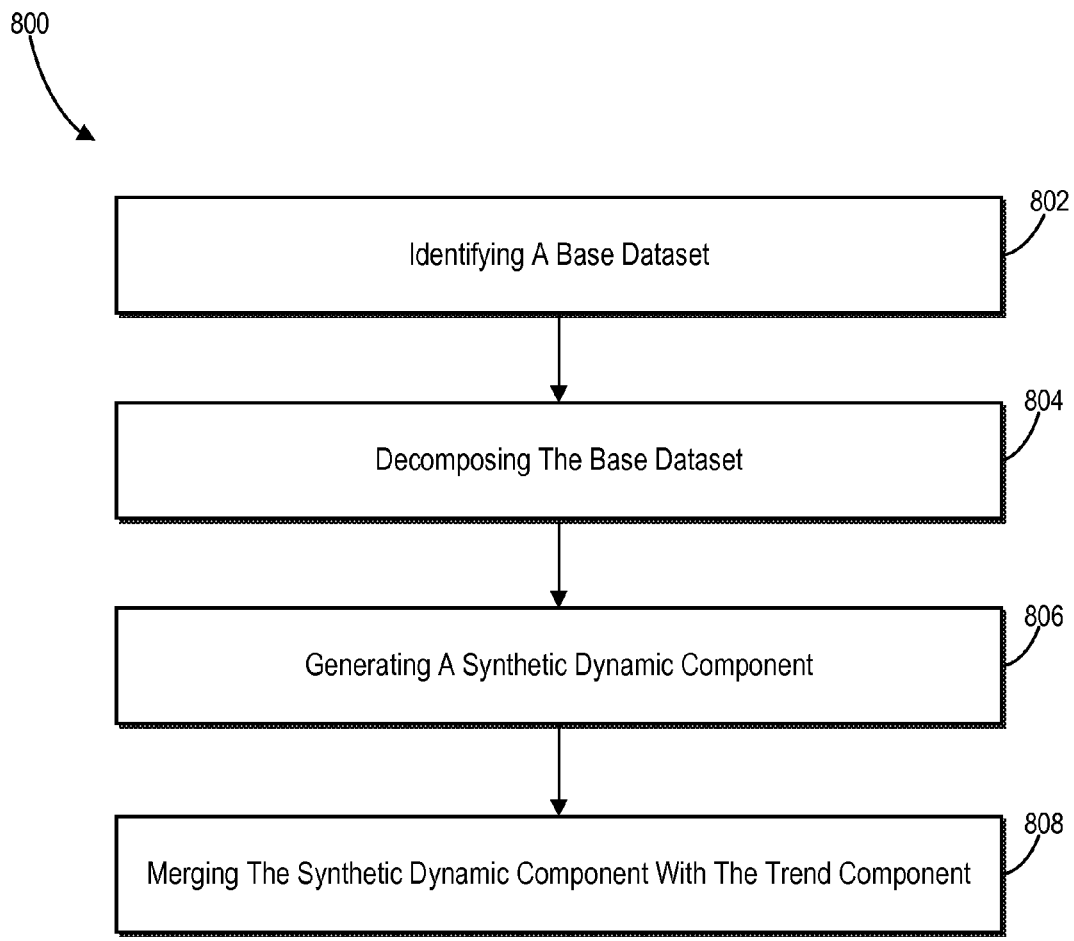
FIG. 8 illustrates a flowchart of a series of acts in a method of generating synthetic data in accordance with one or more embodiments.
Figure 9:
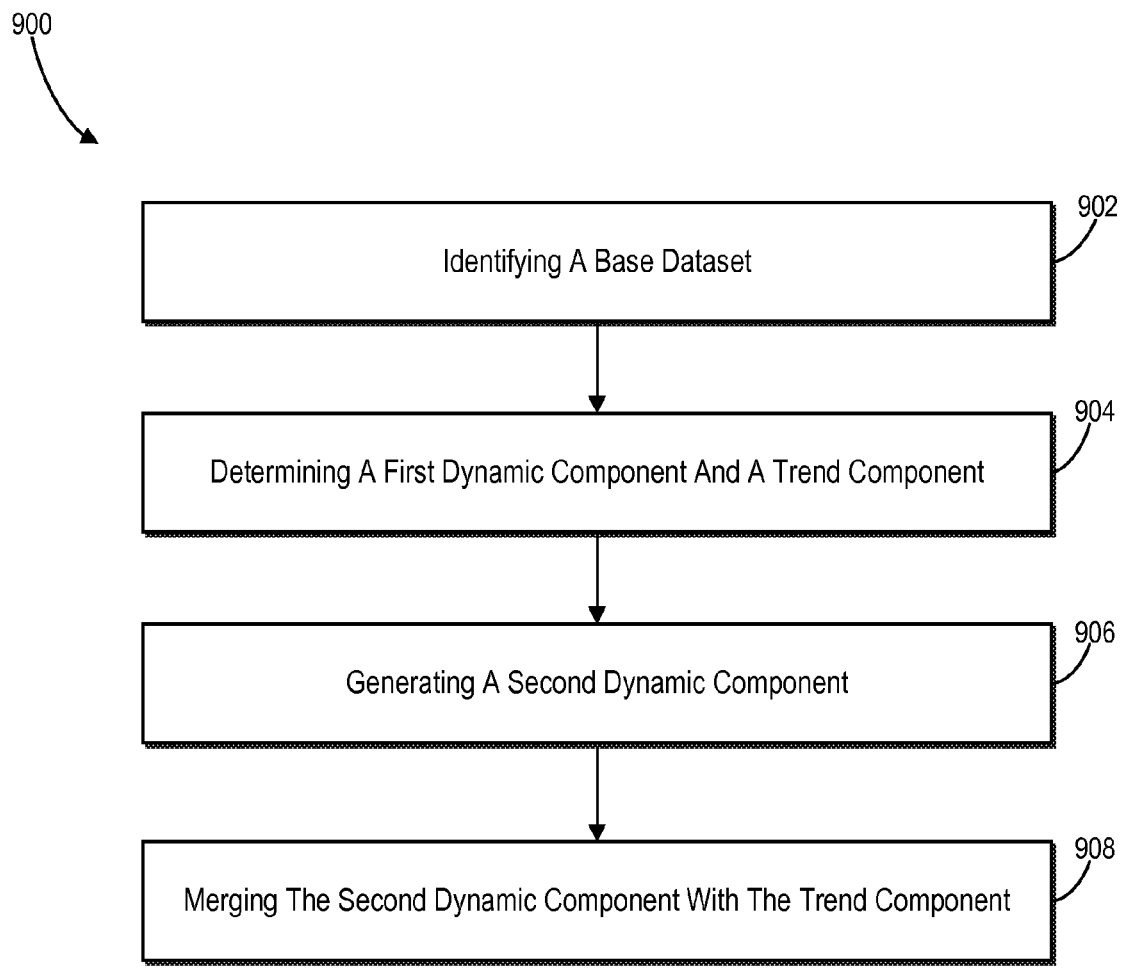
FIG. 9 illustrates a flowchart of a series of acts in a method of generating synthetic data in accordance with one or more embodiments.

FIG. 8 illustrates a flowchart of a series of acts in a method of generating synthetic data. The method 800 includes an act 802 of identifying a base dataset. Specifically, act 802 involves identifying a base dataset 300, 500, 600 describing a set of events corresponding to a time period. For example, the base dataset 300, 500, 600 can comprise stationary data or non-stationary data. As part of act 802, or as an additional act, the method 800 can include smoothing the base dataset 300, 500, 600 using an exponential moving average algorithm before decomposing the base dataset 300, 500, 600 into the plurality of components.

The method 800 also includes an act 804 of decomposing the base dataset 300, 500, 600. In particular, act 804 involves decomposing, by at least one processor, the base dataset 300, 500, 600 into a base dynamic component 312, 504, 606 and a trend component 308, 502, 604 by applying a decomposition model to the base dataset 300, 500, 600. Act 804 can also involve decomposing the base dataset 300, 500, 600 into a seasonal component 310, 602. One or more embodiments of act 804 can involve decomposing the base dataset 300, 500, 600 according to an additive decomposition model.

Additionally, the method 800 includes an act 806 of generating a synthetic dynamic component 316, 506, 608. More specifically, act 806 involves generating, by the at least one processor, a synthetic dynamic component 316, 506, 608 based on the base dynamic component 312, 504, 606. For example, act 806 can also involve determining a normal distribution 400 for the base dynamic component 312, 504, 606, and randomly resampling data points from the base dataset 300, 500, 600 according to the normal distribution 400 of data points in the base dataset 300, 500, 600. Act 806 can also involve randomly resampling the data points according to a three-sigma rule for the normal distribution 400 of the data points in the base dataset 300, 500, 600.

As part of act 806, or as an additional act, the method 800 can include providing, in a graphical user interface 700, a graph comprising a plurality of data points in the synthetic dynamic component 316, 506, 608. The method 800 can include receiving, in the graphical user interface 700, a selection of a particular data point from the plurality of data points. The method 800 can also include moving the particular data point from a first location in the graph to a second location in the graph to introduce an anomaly 702 into the synthetic dynamic component 316, 506, 608.

The method also includes an act 808 of merging the synthetic dynamic component 316, 506, 608 with the trend component 308, 502, 604. In particular, act 808 involves merging, by the at least one processor, the synthetic dynamic component 316, 506, 608 with the trend component 308, 502, 604 to generate a synthetic dataset 302, 508, 610. Act 808 can further involve merging the synthetic dynamic component 316, 506, 608 with the trend component 308, 502, 604 and the seasonal component 310, 602 to generate the synthetic dataset 302, 508, 610.

FIG. 9 illustrates a flowchart of a series of acts in a method 700 of generating synthetic data. The method 900 includes an act 902 of identifying a base dataset 300, 500, 600. Specifically, act 902 involves identifying a base dataset 300, 500, 600 describing a set of events corresponding to a time period.

The method 900 can include an act 904 of determining a first dynamic component 312, 504, 606 and a trend component 308, 502, 604. In particular, act 904 involves determining, by at least one processor, a first dynamic component 312, 504, 606 and at least one static component from the base dataset 300, 500, 600. For example, the at least one static component can comprise a trend component 308, 502, 604 describing a trend associated with the base dataset 300, 500, 600.

Additionally, the method 900 can include an act 906 of generating a second dynamic component 316, 506, 608. Specifically, act 906 involves generating, by the at least one processor, a second dynamic component 316, 506, 608 based on the first dynamic component 312, 504, 606. For example, act 906 can involve determining a normal distribution 400 for the first dynamic component 312, 504, 606, and randomly resampling data points from the first dataset according to the normal distribution 400 of data points in the base dataset 300, 500, 600. In another example act 906 can randomly resampling the data points according to a three-sigma rule for the normal distribution 400 of the data points in the base dataset 300, 500, 600.

As part of act 906, or as an additional act, the method 900 can include providing, in a graphical user interface 700, a graph comprising a plurality of data points in the second dynamic component 316, 506, 608. The method 900 can include receiving, in the graphical user interface 700, a selection of a particular data point from the plurality of data points. The method 900 can also include moving the particular data point from a first location in the graph to a second location in the graph to introduce an anomaly 702 into the second dynamic component 316, 506, 608.

The method 900 can also include an act 908 of merging the second dynamic component 316, 506, 608 with the trend component 308, 502, 604. More specifically, act 908 involves merging, by the at least one processor, the second dynamic component 316, 506, 608 with the at least one static component to generate a synthetic dataset 302, 508, 610. In one example, act 908 can involve merging the second dynamic component 316, 506, 608 with the trend component 308, 502, 604 and a seasonal component 310, 602 of the base dataset 300, 500, 600 to generate the synthetic dataset 302, 508, 610.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
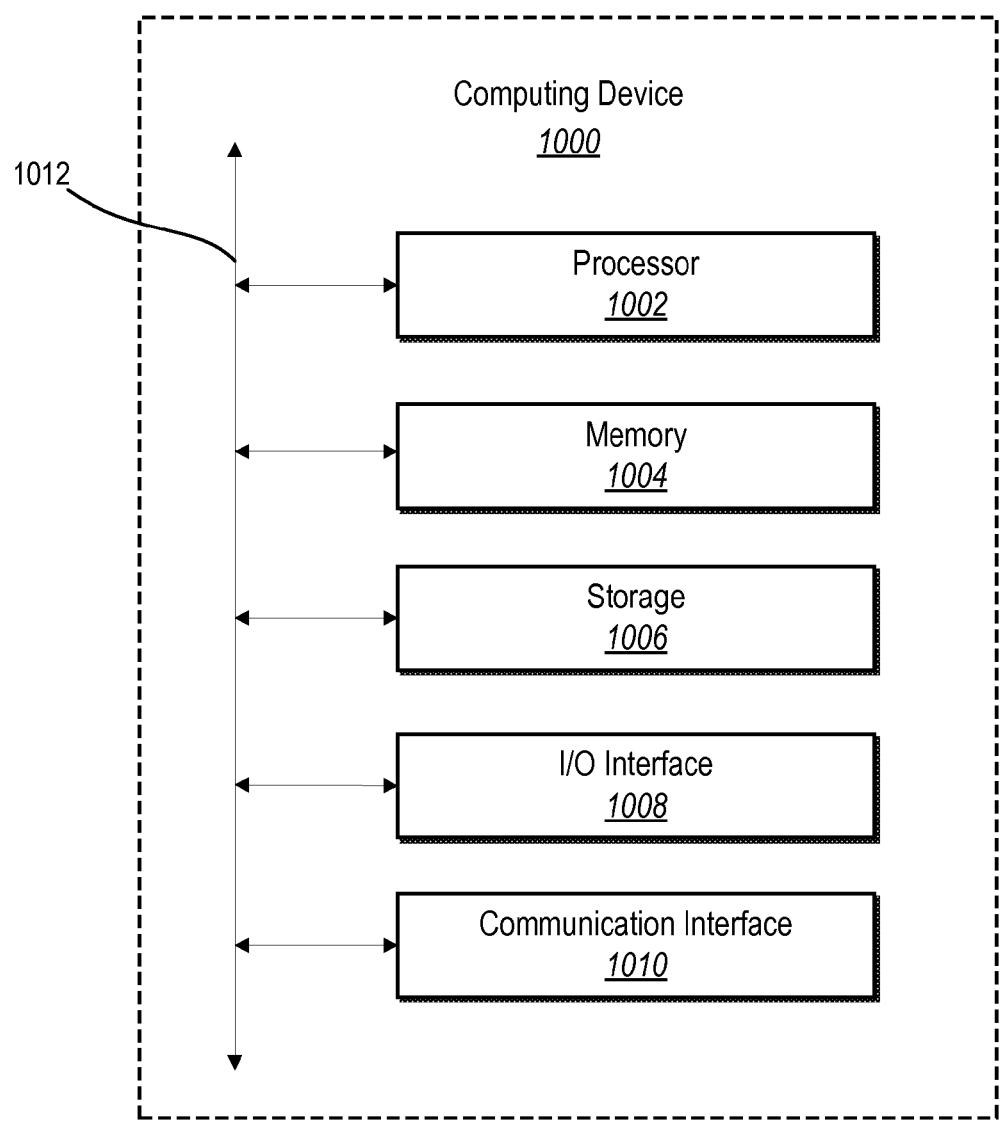
FIG. 10 illustrates a block diagram of an exemplary computing device in accordance with one or more embodiments.

FIG. 10 illustrates a block diagram of an exemplary computing device that may be configured to perform one or more of the processes described above. One will appreciate that the data generation system 100 can comprise implementations of the computing device 1000. As shown by FIG. 10, the computing device can comprise a processor 1002, memory 1004, a storage device 1006, an I/O interface 1008, and a communication interface 1010. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them. In particular embodiments, processor(s) 1002 may include one or more internal caches for data, instructions, or addresses. As an example and not by way of limitation, processor(s) 1002 may include one or more instruction caches, one or more data caches, and one or more translation lookaside buffers (TLBs). Instructions in the instruction caches may be copies of instructions in memory 1004 or storage 1006.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In particular embodiments, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1010. As an example and not by way of limitation, computing device 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1000 may include any suitable communication interface 1010 for any of these networks, where appropriate.

The computing device 1000 can further include a bus 1012. The bus 1012 can comprise hardware, software, or both that couples components of computing device 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

One or more embodiments of the present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method of generating synthetic data, comprising:
    identifying, by at least one processor, a base dataset describing a set of events corresponding to a time period;
    decomposing, by the at least one processor, the base dataset into a base dynamic component and a trend component by applying a decomposition model to the base dataset, the base dynamic component comprising a plurality of data points that do not correspond to any time-dependent characteristics of the base dataset and the trend component comprising data points with a time-dependent characteristic that indicates a trend associated with the base dataset;
    generating, by the at least one processor, a synthetic dynamic component by randomly resampling the data points from the base dynamic component to create a plurality of synthetic data points that do not correspond to the time-dependent characteristics of the base dataset;
    generating, by the at least one processor, a synthetic dataset comprising new data points with the time-dependent characteristic that indicates the trend associated with the base dataset by combining the synthetic data points in the synthetic dynamic component with the data points in the trend component; and
    predicting, by the at least one processor using the generated synthetic dataset, a future dataset for the base dataset, the predicted future dataset comprising a plurality of predicted data points according to the time-dependent characteristic.

2. The method as recited in claim 1, wherein generating the synthetic dynamic component comprises randomly resampling data points from the base dynamic component to create the plurality of synthetic data points according to a distribution constraint on the base dynamic component.

3. The method as recited in claim 2, wherein generating the synthetic dynamic component further comprises:
    determining a normal distribution for the plurality of data points in the base dynamic component; and
    randomly resampling data points from the base dynamic component according to the normal distribution of the plurality of data points in the base dynamic component to create the synthetic data points.

4. The method as recited in claim 3, wherein generating the synthetic dynamic component further comprises randomly resampling the data points of the base dynamic component according to a three-sigma rule for the normal distribution of the plurality of data points in the base dynamic component.

5. The method as recited in claim 1, wherein decomposing the base dataset further comprises decomposing the base dataset into a seasonal component comprising data points with a seasonal characteristic indicating a seasonal effect associated with the set of events.

6. The method as recited in claim 5, wherein generating the synthetic dataset further comprises combining the data points in the synthetic dynamic component with the data points in the trend component and the data points in the seasonal component to create the new data points that include the trend from the trend component and seasonal information from the seasonal component.

7. The method as recited in claim 1, wherein decomposing the base dataset into a plurality of components comprises decomposing the base dataset according to an additive decomposition model.

8. The method as recited in claim 1, further comprising:
providing, in a graphical user interface, a graph comprising a plurality of data points in the synthetic dynamic component;
receiving, in the graphical user interface, a selection of a particular data point from the plurality of data points;
moving the particular data point from a first location in the graph to a second location in the graph to introduce an anomaly into the synthetic dynamic component; and
merging the synthetic dynamic component comprising the anomaly with the trend component to introduce the anomaly into the generated synthetic dataset.

9. The method as recited in claim 1, wherein decomposing the base dataset comprises smoothing the base dataset using an exponential moving average algorithm to isolate the trend component from the base dataset.

10. The method as recited in claim 9, wherein decomposing the base dataset further comprises removing the trend component from the base dataset to obtain the base dynamic component.

11. A method of generating synthetic data, comprising:
identifying, by at least one processor, a base dataset comprising a plurality of data points with at least one time-dependent characteristic;
determining, by the at least one processor, a first dynamic component and at least one static component from the base dataset by decomposing the base dataset, the first dynamic component comprising a plurality of data points that do not correspond to any time-dependent characteristics of the base dataset, and the at least one static component comprising a time-dependent characteristic;
generating, by the at least one processor, a second dynamic component by randomly resampling the data points from the first dynamic component to create a plurality of synthetic data points that do not correspond to the time-dependent characteristics of the base dataset;
generating, by the at least one processor, a synthetic dataset comprising new data points with the time-dependent characteristic by combining the synthetic data points in the second dynamic component with the data points in the at least one static component; and
predicting, by the at least one processor using the generated synthetic dataset, a future dataset for the base dataset, the predicted future dataset comprising a plurality of predicted data points according to the time-dependent characteristic.

12. The method as recited in claim 11, wherein the time-dependent characteristic of the at least one static component comprises a trend component describing a trend associated with the base dataset.

13. The method as recited in claim 12, wherein the at least one static component further comprises a seasonal component comprising data points with a time-dependent characteristic that describes a seasonal effect associated with the base dataset.

14. The method as recited in claim 13, wherein generating the synthetic dataset comprises merging the synthetic data points in the second dynamic component with the data points in the trend component and the data points in the seasonal component of the base dataset to create new data points that include the trend from the trend component and the seasonal effect from the seasonal component.

15. The method as recited in claim 13, wherein determining, by the at least one processor, the first dynamic component comprises subtracting the trend component and the seasonal component from the base dataset.

16. The method as recited in claim 11, wherein generating the second dynamic component comprises randomly resampling data points of the first dynamic component to create the plurality of synthetic data points according to a distribution constraint on the first dynamic component.

17. The method as recited in claim 15, wherein generating the second dynamic component further comprises randomly resampling the data points of the first dynamic component according to a three-sigma rule.

18. A system for generating synthetic data, comprising:
at least one processor:
at least one non-transitory computer readable storage medium storing instructions thereon, that, when executed by the at least one processor, cause the system to:
identify a base dataset describing a set of events corresponding to a time period;
decompose the base dataset into a base dynamic component and a trend component by applying a decomposition model to the base dataset, the base dynamic component comprising a plurality of data points that do not correspond to any time-dependent characteristics of the base dataset and the trend component comprising data points with a time-dependent characteristic that indicates a trend associated with the base dataset;
generate a synthetic dynamic component by randomly resampling the data points from the base dynamic component to create a plurality of synthetic data points that do not correspond to the time-dependent characteristics of the base dataset;
generate, by the at least one processor, a synthetic dataset comprising new data points with the time-dependent characteristic that indicates the trend associated with the base dataset by combining the synthetic data points in the synthetic dynamic component with the data points in the trend component; and
predicting, by the at least one processor using the generated synthetic dataset, a future dataset for the base dataset, the predicted future dataset comprising a plurality of predicted data points according to the time-dependent characteristic.

19. The system as recited in claim 18, wherein the instructions, when executed by the at least one processor, cause the system to generate the synthetic dynamic component by:
determining a normal distribution for the plurality of data points in the base dynamic component; and
randomly resampling data points from the base dynamic component according to the normal distribution of the plurality of data points in the base dynamic component to create the plurality of synthetic data points.

20. The system as recited in claim 18, wherein the instructions, when executed by the at least one processor, cause the system to generate the synthetic dataset by combining the synthetic data points in the synthetic dynamic component with the data points in the trend component and data points in a seasonal component of the base dataset to create the new data points that include the trend from the trend component and seasonal information from the seasonal component.

* * * * *